(12) United States Patent
Park et al.

(10) Patent No.: US 10,397,760 B2
(45) Date of Patent: Aug. 27, 2019

(54) USER TERMINAL DEVICE AND METHOD FOR PROVIDING WEB SERVICE THEREOF

(71) Applicant: SAMSUNG ELECTRONICS CO., LTD., Suwon-si, Gyeonggi-do (KR)

(72) Inventors: Ki-chul Park, Yongin-si (KR); Hong-uk Woo, Seoul (KR); Ming Jin, Yongin-si (KR); Yong-jin Kim, Seoul (KR); Jong-won Kim, Seoul (KR); Ho-yong Jung, Suwon-si (KR); Hun-seop Jeong, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 40 days.

(21) Appl. No.: 15/277,094

(22) Filed: Sep. 27, 2016

(65) Prior Publication Data

US 2017/0118574 A1    Apr. 27, 2017

(30) Foreign Application Priority Data

Oct. 23, 2015 (KR) .................. 10-2015-0147934
Jun. 10, 2016 (KR) .................. 10-2016-0072550

(51) Int. Cl.
*H04W 4/00* (2018.01)
*H04W 4/50* (2018.01)
*H04L 29/08* (2006.01)

(52) U.S. Cl.
CPC .............. *H04W 4/50* (2018.02); *H04L 67/02* (2013.01); *H04L 67/34* (2013.01)

(58) Field of Classification Search
CPC ............................. H04W 4/001; H04L 67/02
See application file for complete search history.

(56) References Cited

U.S. PATENT DOCUMENTS

| 7,904,209 B2 | 3/2011 | Podgorny et al. |
| 8,893,032 B2 | 11/2014 | Bruch et al. |
| 2002/0103875 A1* | 8/2002 | Krishnan ............... H04L 29/06 709/217 |
| 2002/0184256 A1* | 12/2002 | Reich ............... G06F 17/30887 715/234 |
| 2005/0101312 A1 | 5/2005 | Kang |

(Continued)

FOREIGN PATENT DOCUMENTS

| JP | 2014-081937 | 5/2014 |
| KR | 1998-023617 | 7/1998 |

(Continued)

OTHER PUBLICATIONS

Search Report and Written Opinion dated Jan. 13, 2017 in counterpart International Patent Application No. PCT/PCT/KR2016/010892.

(Continued)

*Primary Examiner* — Omoniyi Obayanju
(74) *Attorney, Agent, or Firm* — Nixon & Vanderhye P.C.

(57) ABSTRACT

A user terminal device and a method for providing a web service thereof are provided. The web service providing method of a user terminal device includes connecting to a web server which provides a web service, setting at least one of a plurality of web services provided by the web server based on a user command, and transmitting information on an address of the set web service to an external IoT device.

15 Claims, 25 Drawing Sheets

(56) References Cited

U.S. PATENT DOCUMENTS

| | | | |
|---|---|---|---|
| 2008/0270562 A1 | 10/2008 | Jin et al. | |
| 2009/0119602 A1 | 5/2009 | Kazuo | |
| 2012/0284652 A1 | 11/2012 | Kuo et al. | |
| 2012/0316984 A1* | 12/2012 | Glassman | G06Q 10/06 705/26.7 |
| 2013/0138770 A1 | 5/2013 | Kim et al. | |
| 2014/0108943 A1 | 4/2014 | Lee et al. | |
| 2015/0121470 A1 | 4/2015 | Rongo et al. | |
| 2015/0156266 A1 | 6/2015 | Gupta | |
| 2015/0201022 A1 | 7/2015 | Kim et al. | |

FOREIGN PATENT DOCUMENTS

| | | |
|---|---|---|
| KR | 10-0434292 | 6/2004 |
| KR | 10-2015-0090937 | 8/2015 |
| WO | 2014/182692 | 11/2014 |

OTHER PUBLICATIONS

European Extended Search Report for EP Application No. 16857680.9 dated Jun. 8, 2018.

\* cited by examiner

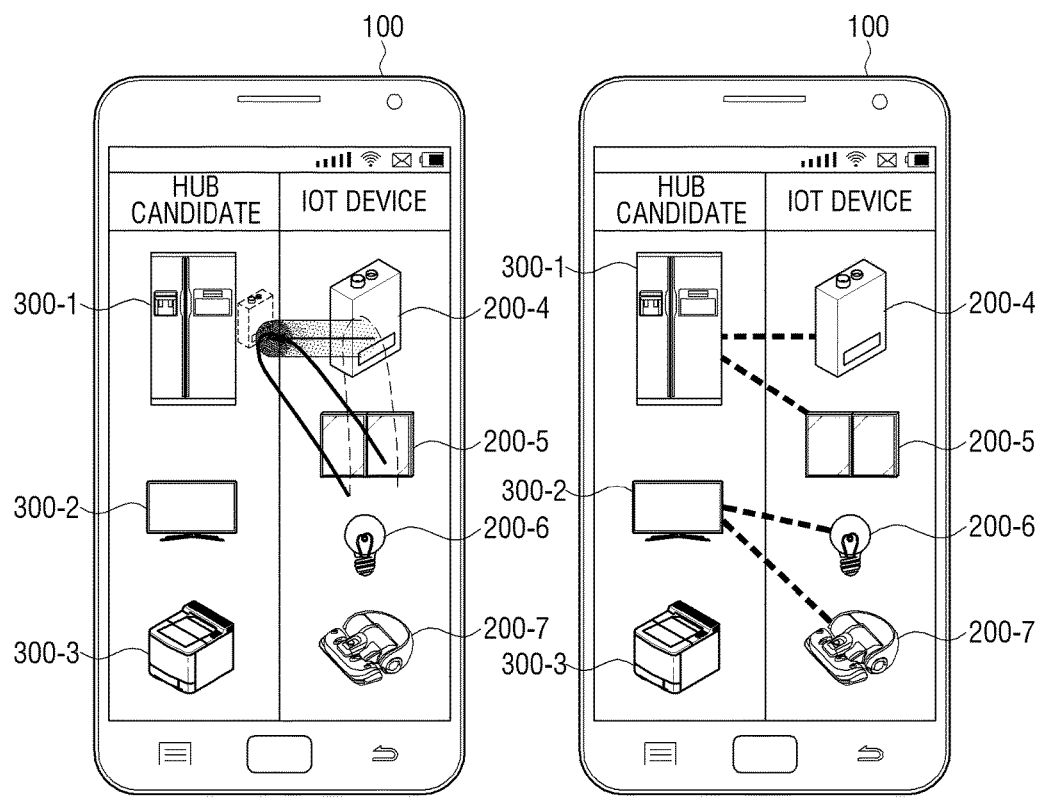

USER TERMINAL DEVICE AND METHOD FOR PROVIDING WEB SERVICE THEREOF

CROSS-REFERENCE TO RELATED APPLICATIONS

This application is based on and claims priority under 35 U.S.C. § 119 to Korean Patent Application Nos. 10-2015-0147934 and 10-2016-0072550, filed in the Korean Intellectual Property Office on Oct. 23, 2015 and Jun. 10, 2016, respectively, the disclosures of which are incorporated by reference herein in their entireties.

BACKGROUND

1. Field

Aspects of the example embodiments relate generally to a user terminal device and a method for providing a web service thereof, and for example, to a user terminal device which provides a web service by providing script information to an IoT device and a method for providing a web service thereof.

2. Description of Related Art

Recently, the Internet of Things (IoT) technology, which is a communication technology to allow users to connect to things in our daily lives to share information or enjoy a specific service, has been developed.

The current IoT technology has a structure where a web service is provided through a hub device and an IoT device is controlled through a smart device. However, the current IoT technology does not have a standardized technology to connect an IoT device with a service. Accordingly, if there is no connection between IoT devices or if an IoT device is not linked to an existing web service, a user needs to purchase several hubs to be provided with a new web service.

SUMMARY

An aspect of the example embodiments relates to a terminal device, e.g., a user terminal device, which provides information on an address corresponding to a web service to an IoT device so that the IoT device can download script information from a web server and provide the web service.

According to an example embodiment, a method for providing a web service of a user terminal device is provided, the method including connecting the user terminal device to a web server which provides a web service, setting at least one of a plurality of web services provided by the web server based on a received user command, and transmitting information on an address of the set web service to an external IoT device.

The IoT device may connect to the web server based on the address information and download script information corresponding to the web service.

The IoT device, in response to sensing a predetermined state based on the script information, may request the web server to provide a web service.

The method may include displaying a UI regarding a web service which is performed in response to the request.

The method may include, in response to sensing a predetermined state based on the script information by the IoT device, receiving URL information corresponding to the predetermined state from the IoT device and providing a web service based on the received URL information.

The IoT device, in response to a button on the IoT device being selected, may transmit a product purchase request corresponding to the button to the web server based on the script information, and the method may include receiving information regarding the product purchase request from the web server and displaying information regarding the received product purchase request.

The IoT device, in response to sensing a predetermined state of another external IoT device based on the script information, may request the web server to provide a web service.

The IoT device may control a setting of the IoT device based on the script information.

The setting may include displaying a list including a plurality of web services provided by the web server, and in response to at least one of the plurality of web services included in the list being selected, setting the selected web service as a service to be transmitted to the IoT device.

According to an example embodiment, a user terminal device is provided, the terminal device including a communicator comprising communication circuitry configured to perform communication with a web server and an IoT device, an input unit including input circuitry configured to receive a command, and a processor configured to control the communication circuitry of the communicator to connect to the web server through the communicator, to set at least one of a plurality of web services provided by the web server based on a received command and to transmit information on an address of the set web service to an external IoT device.

The IoT device may connect to the web server based on the address information and download script information corresponding to the web service.

The IoT device, in response to sensing a predetermined state based on the script information, may request the web server to provide a web service.

The device may further include a display, and the processor may control the display to display a UI regarding a web service which is performed in response to the request.

The processor, in response to sensing a predetermined state based on the script information by the IoT device, may control the communication circuitry of the communicator to receive URL information corresponding to the predetermined state from the IoT device, and provide a web service based on the received URL information.

The IoT device, in response to a button on the IoT device being selected, may transmit a product purchase request corresponding to the button to the web server based on the script information, and the processor may control the communication circuitry of the communicator to receive information regarding the product purchase request from the web server, and provide the received information regarding the product purchase request.

The IoT device, in response to sensing a predetermined state of another external IoT device based on the script information, may request the web server to provide a web service.

The IoT device may control a setting of the IoT device based on the script information.

The device may further include a display, and the processor may control the display to display a list including a plurality of web services provided by the web server, and in response to at least one of the plurality of web services included in the list being selected, set the selected web service as a service to be transmitted to the IoT device.

According to an example embodiment, a computer readable recording medium storing a program to perform a service providing method of a user terminal device is provided, wherein the service providing method of a user terminal device includes connecting the terminal to a web server which provides a web service, setting at least one of a plurality of web service which are provided by the web server based on a user command, and transmitting information on an address of the set web service to an external IoT device.

According to the above-described various example embodiments, in order to perform a desired web service, information on an address corresponding to the web service is provided to an IoT device, and the IoT device receives script information based on the address information and provides the web service. Accordingly, a user may provide various web services to a remote IoT device through a smart device.

BRIEF DESCRIPTION OF THE DRAWINGS

The above and/or other aspects of the disclosure will be more apparent from the following detailed description, taken in conjunction with the accompanying drawings, in which like reference numerals refer to like elements, and wherein:

FIGS. 15A and 15B are diagrams illustrating an example UI for performing a web service according to various example embodiments.

DETAILED DESCRIPTION

Figure 1A:
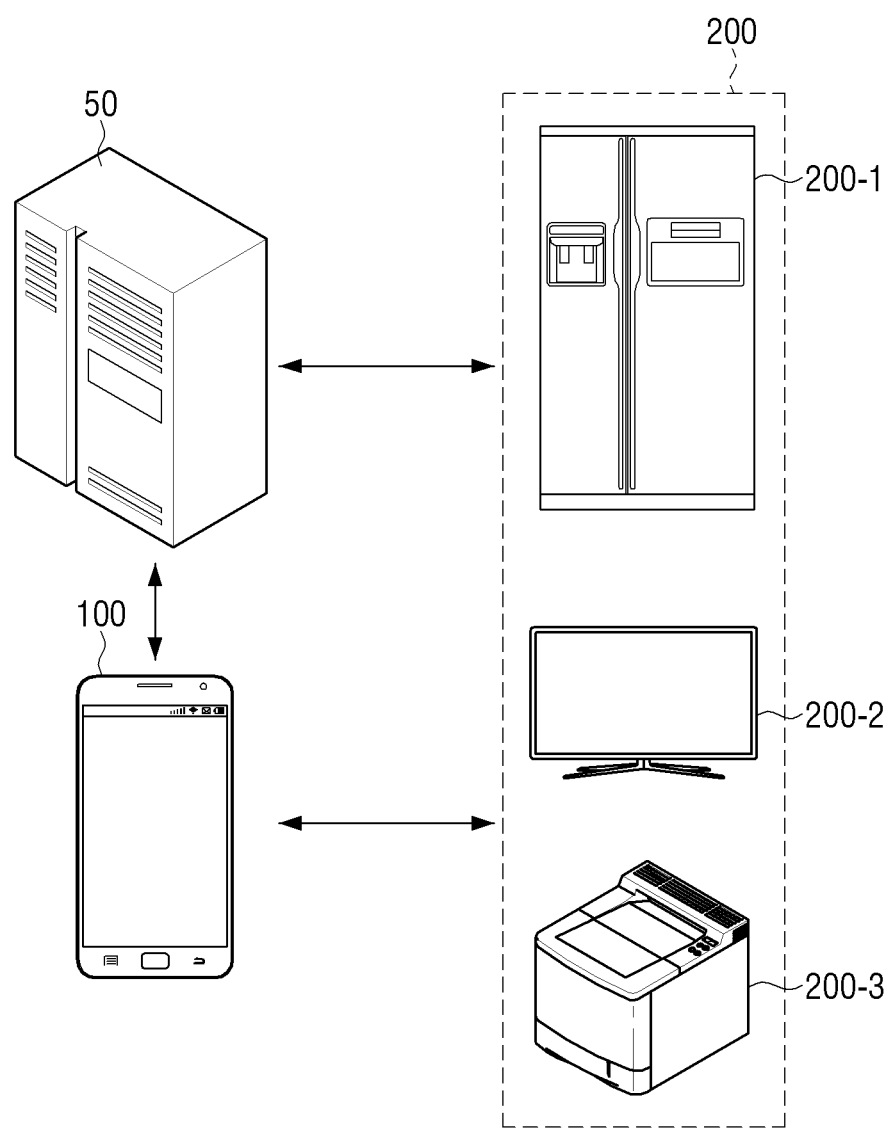
FIGS. 1A, 1B and 1C are diagrams illustrating an example web service providing system according to an example embodiment.

Hereinafter, various example embodiments will be described in greater detail with reference to the accompanying drawings.

The terms used in the description of example embodiments of the present disclosure are general terms which are widely used now and selected considering the functions of the present disclosure. However, the terms may vary depending on the intention of a person skilled in the art, a precedent, or the advent of new technology. In addition, in certain instances, a term arbitrarily selected may be used. In this case, the meaning of the term will be explained in the corresponding description. Therefore, the terms used in the present disclosure should be defined based on the meanings of the terms and the descriptions made herein, rather than the names of the terms.

Certain example embodiments of the disclosure will now be described in greater detail with reference to the accompanying drawings. However, the technologies described herein are not to be limited to any specific example embodiments, but should be understood as encompassing a variety of modifications, equivalents, and/or alternatives of the present disclosure. In addition, in the following description, detailed descriptions of well-known functions or configurations may be omitted since they may unnecessarily obscure the subject matters of the disclosure.

Although the terms such as "first" and "second" may be used to explain various elements, the elements should not be limited by these terms. These terms may be used for the purpose of distinguishing one element from another element.

In addition, the singular forms are intended to include the plural forms as well, unless the context clearly indicates otherwise. In addition, it should be understood that the terms "include" or "have" used in the example embodiments of the present disclosure indicate the presence of features, numbers, steps, operations, elements, parts, or a combination thereof described in the specifications, and do not preclude the presence or addition of one or more other features, numbers, steps, operations, elements, parts, or a combination thereof.

In addition, "module" or "unit" used in the example embodiments perform at least one function or operation and may be implemented by using hardware (e.g., circuitry, including but not limited to processing circuitry including for example a CPU) or software or a combination of hardware and software. In addition, a plurality of "modules" or a plurality of "units" may be integrated into at least one module and implemented by using at least one processor (not shown), except for "modules" or "units" which are implemented using specific example hardware.

It will be understood that, when an element is mentioned as being "connected" to another element, the element may be "directly connected" to another element, and may be "electrically connected" to another element with an intervening element between the element and another element. In addition, when a part "include" a certain element, it should be understood that another element may be further included rather than excluded unless otherwise described.

Hereinafter, an example embodiment will be described in greater detail with reference to accompanying drawings so that the those skilled in the related art with common knowledge may easily understand the present disclosure. However, the present disclosure may be implemented in various forms and thus, is not limited to the example embodiments described herein. In the following description, the parts which are irrelevant to the present disclosure may be omitted to describe the present disclosure clearly and same reference numerals are used for analogous elements when they are depicted in different drawings.

In addition, the term "application" in the example embodiments may refer, for example, to a set of computer programs designed to perform a specific function. There may be various applications in the example embodiments. For example, the application may include a game application, a moving image replay application, a map application, a memo application, a calendar application, a phone book application, a broadcast application, an exercise support application, a payment application, a photo folder application, a medical device control application, an interface providing application for users of a plurality of medical devices, etc. but is not limited thereto.

In addition, the term "web service" in the example embodiments may refer, for example, to a service which is performed based on script information received from a web server, and may include a product purchase service, a product advertisement service, an IoT device control service, etc.

In addition, the term "User Interface (UI) element" in the example embodiments may refer, for example, to an element which can interact with a user and thus provide visual, auditory, tactual, olfactory feedback, etc. according to a user input.

Figure 1B:
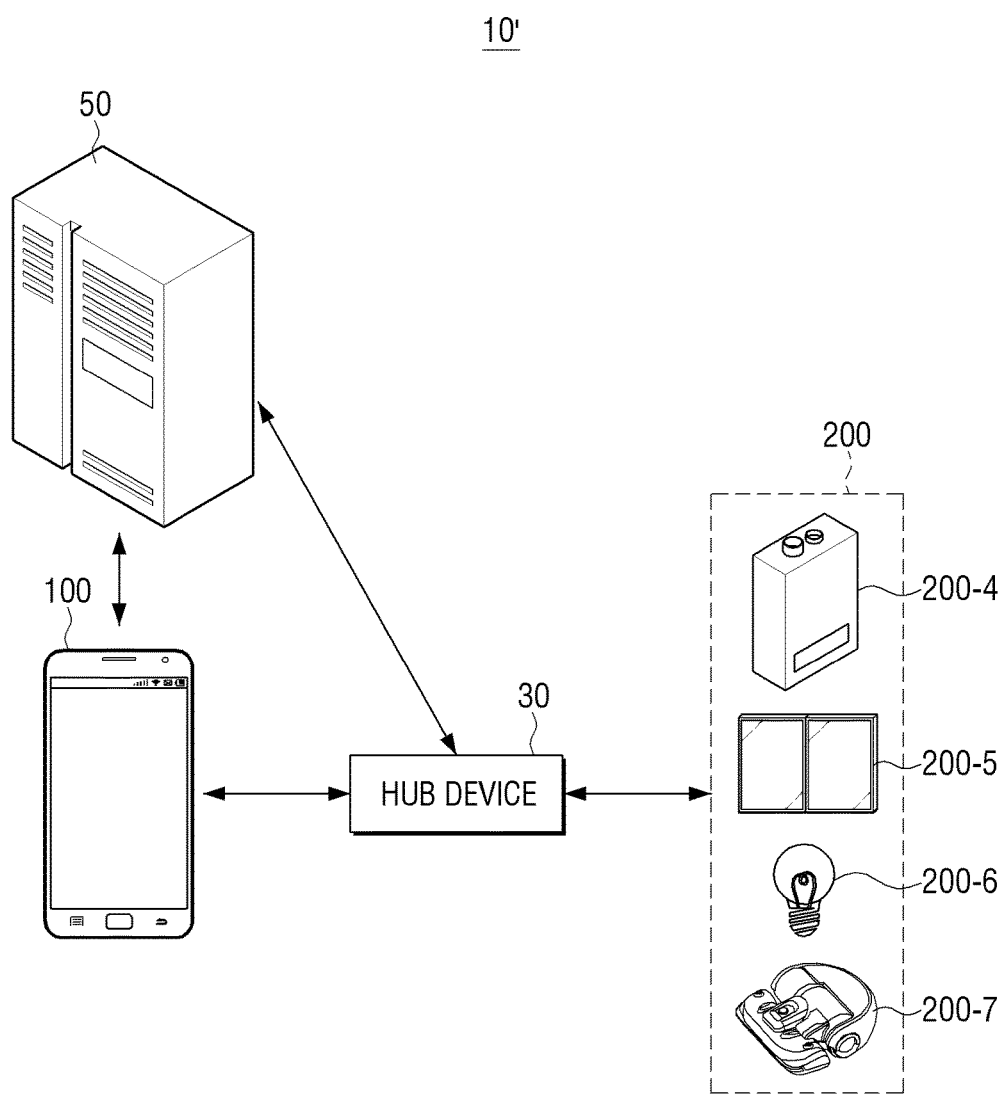
Figure 1C:
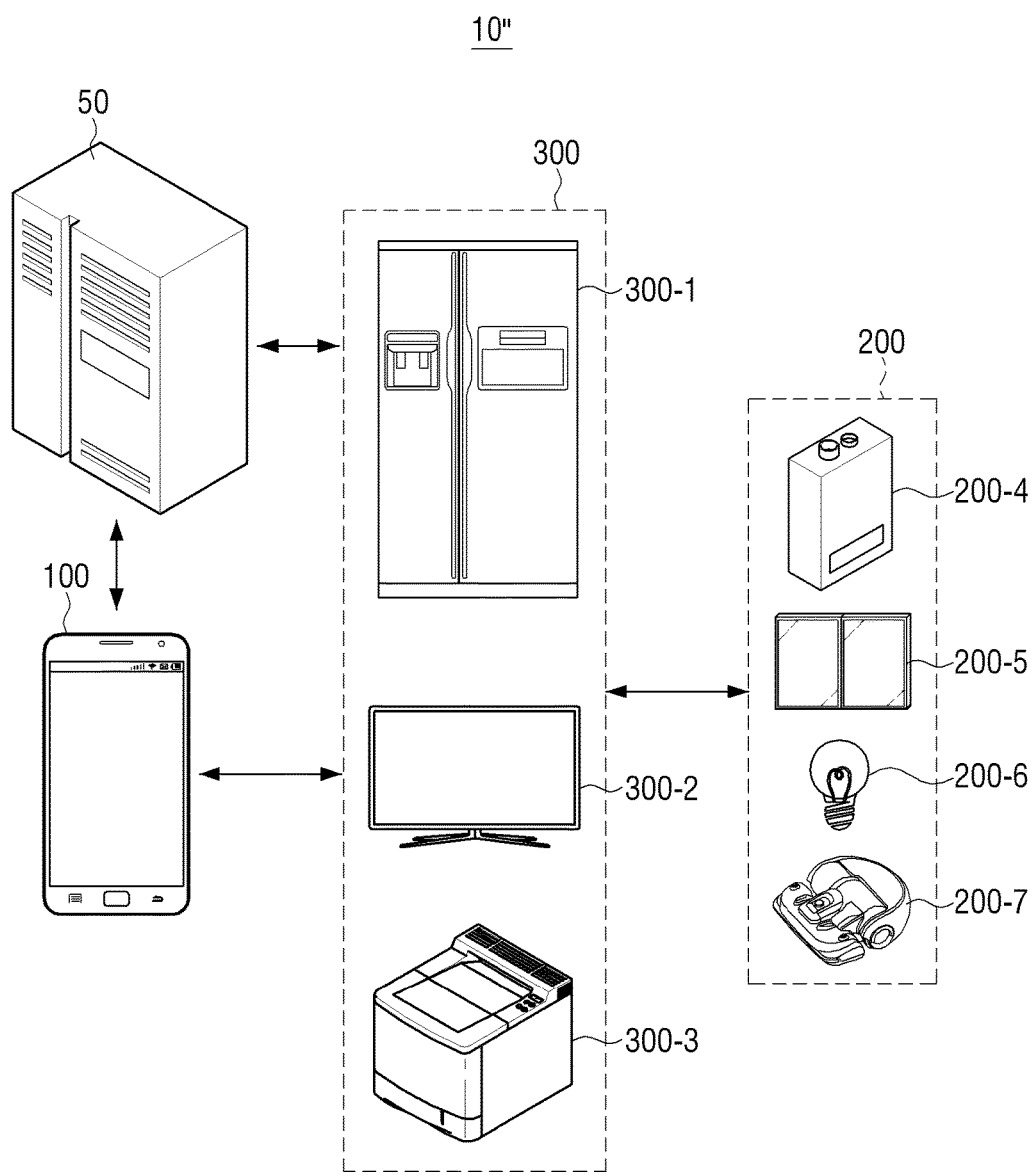

FIGS. 1A to 1C are diagrams illustrating an example web service providing system 10, 10', 10" according to an example embodiment.

FIG. 1A illustrates an example web service providing system 10 which is directly connectable by a web server 50 and an IoT device 200, FIG. 1B illustrates a web service providing system 10' which is connectable by the web server 50 and the IoT device 200 through a hub device 30, and FIG. 1C illustrates a web service providing system 10" which is connectable by the web server 50 and the IoT device 200 through other IoT devices 300 which may serve as the hub device 30.

In this example, the IoT device 200 of FIG. 1A may be a high-specification electronic device having a remote network communication module which may perform communication remotely with the web server 50 and the user terminal device 100. In addition, the IoT device 200 of FIG. 1A may be a high-specification electronic device having both a remote network communication module and a local network communication module to perform remote communication with the IoT device 200 and the web server 50 and to perform near-field communication with the user terminal device 100. As illustrated in the drawings, the IoT device 200 of FIG. 1A may be, for example, a refrigerator 200-1, a smart TV 200-2, a printer 200-3, etc., but is not limited thereto, and will be described in greater detail below.

On the other hand, the IoT device 200 of FIGS. 1B and 1C may include a local network communication module only or may be a low-specification IoT device with a small storage space not enough to store script information or without a display function. For example, as illustrated in the drawings, the IoT device 200 of FIGS. 1B and 1C may, for example, be a boiler 200-4, a window 200-5, a light 200-6, or a cleaning robot 200-7, but is not limited thereto, and will be described in greater detail below.

In FIG. 1A, the web service providing system 10 includes the web server 50, the user terminal device 100 and a plurality of IoT devices 200-1, 200-2, 200-3.

In this example, the web server 50 may, for example, be a server which provides a web service, and may transmit script information to perform a web service to the plurality of IoT devices 200-1, 200-2, 200-3. In addition, the web server 50 may perform a web service in itself based on a request from an IoT device or may provide a web service to the user terminal device 100.

The user terminal device 100 may transmit information on an address (for example, URL address) corresponding to a web service set by a user from among a plurality web services provided by a web server to the plurality of IoT devices 200-1, 200-2, 200-3. In addition, the user terminal device 100 may provide a web service requested by the web server 50 to a user.

The user terminal device 100 according to an example embodiment may include, for example, at least one of smart phone, tablet personal computer, mobile phone, video phone, e-book reader, desktop personal computer, laptop personal computer, netbook computer, workstation, personal digital assistant, portable multimedia player, MP3 player, mobile medical device, camera, and wearable device, or the like, but is not limited thereto. According to various example embodiments, the wearable device may be one of an accessory-type device (for example, watch, ring, bracelet, ankle bracelet, necklace, glasses, contact lens or head-mounted device (HMD)), textile or clothing-type device (for example, e-clothing), body-attached-type device (skin pad or tattoo), or bioimplant-type device (for example, implantable circuit), or the like, but is not limited thereto.

The IoT device 200 may connect to the web server 50 based on the address information transmitted by the user terminal device 100 and may download script information to perform a web service. If a specific state of the IoT device is sensed based on the script information, the IoT device 200 may perform a web service corresponding to the specific state or request the user terminal device 100 or web server 50 to provide the web service. For example, when the IoT device 200 is a refrigerator, if it is sensed that there is no water in the refrigerator, the IoT device 200 may request a product purchase service for ordering water from the web service 50 based on script information. In this example, the web server 50 may perform the product purchase service immediately, but may, for example, request the product purchase service from the user terminal device 100 for user confirmation.

The IoT device 200 according to an example embodiment may be various home appliances. The home appliances may include, for example, at least one of smart TV, digital video disk player, audio, refrigerator, air conditioner, cleaner, oven, microwave, washing machine, air purifier, set-top box, home automation control panel, security control panel, TV box (for example, Samsung HomeSync™, Apple TV™, or Google TV™), game console (for example, Xbox™, PlayStation™), e-dictionary, e-key, camcorder, and e-album, or the like, but is not limited thereto. In addition, the IoT device 200 may be a sensor for sensing a state in a house. In this example, the sensor may be implemented as various sensors such as motion sensor, temperature sensor, humidity sensor, illumination sensor, etc.

FIG. 1B is a view illustrating the web service providing system 10' which further includes the hub device 30 in comparison with the web service providing system 10 of FIG. 1A. For example, the IoT device 200 of FIG. 1A may be a high-specification electronic device which may perform communication with the user terminal device 100 remotely. However, if there is the low-specification IoT device 200 which supports only local network connection, as illustrated in FIG. 1B, the web service providing system 10' may control the low-specification IoT device 200 using the hub device 30.

For example, the hub device 30 may receive information on an address corresponding to a web service from the user terminal device 100. The hub device 30 may download script information to perform a web service from the web server 50 based on the address information. In addition, the hub device 30 may sense the state of the IoT device 200. If a specific state of the IoT device is sensed, the hub device 30 may request a web service corresponding to the specific state from the web server 50 or the user terminal device 100.

In this example, the hub device 30 may be a separate device such as home gateway and home server.

FIG. 1C is a diagram illustrating an example web service providing system 10" where the role of the hub device 30 is performed by the user terminal device 100 and/or the high-specification IoT device 300 which can communicate with the web server 50. In FIG. 1C, the web service providing system 10" may control the low-specification IoT device 200 using the high-specification IoT device 300.

For example, the high-specification IoT device 300 may receive information on an address corresponding to a web service from the user terminal device 100. The high-specification IoT device 300 may download script information to perform a web service from the web server 50 based on the address information.

The high-specification IoT device 300 may sense the state of the low-specification IoT device 200. Alternatively, the high-specification IoT device 300 may acquire the state information acquired by the low-specification IoT device 200.

If it is sensed that the low-specification IoT device 200 is in a specific state, the high-specification IoT device 300 may request a web service corresponding to the specific state from the web server 50 or the user terminal device 100. Alternatively, the low-specification IoT device 200 may transmit a control command to the low-specification IoT device 200 based on the received script information.

In order for the high-specification IoT device 300 to serve as a hub, the low-specification IoT device 200 needs to be registered in the high-specification IoT device 300 in advance. A detailed example embodiment for registering the low-specification IoT device 200 in the high-specification IoT device 300 will be described in greater detail below with reference to FIGS. 14 and 15.

Figure 2:
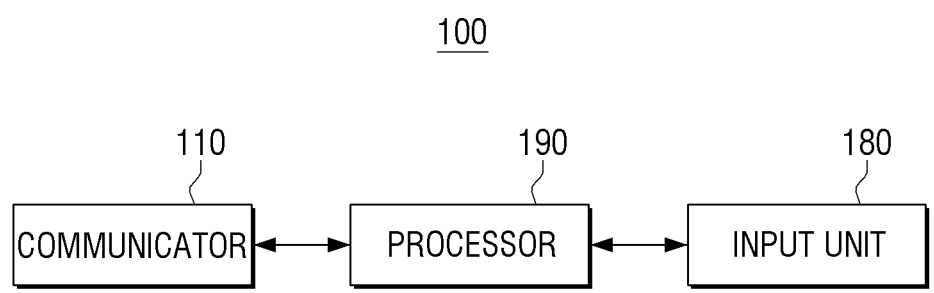
FIG. 2 is a block diagram illustrating an example configuration of a user terminal device briefly according to an example embodiment.

FIG. 2 is a block diagram illustrating an example configuration of the user terminal device 100 according to an example embodiment. As illustrated in FIG. 2, the user terminal device 100 includes a communicator (e.g., including communication circuitry) 110, an input unit (e.g., including input circuitry) 180 and a processor 190.

The communicator 110 includes various communication circuitry configured to perform communication with the external web server 50 or the IoT device 100. For example, the communicator 110 may transmit Internet address information (for example, URL information) to acquire a script corresponding to a web service which is set by a user to the IoT device 100.

The input unit 180 includes various input circuitry configured to receive a user command. For example, the input unit 180 may set a web service that a user wishes to perform. In this example, the web service may include a product purchase service, a product advertisement service, an IoT device control service, etc.

The processor 190 controls the overall operations of the user terminal device 100. For example, the processor 190 may connect to the web server 50 through the communication circuitry of the communicator 110 and set at least one of a plurality of web services provided by the web server 50 based on a user command which is input through the input circuitry of the input unit 180. For example, the processor 190 may control a display to display a list including the plurality of web services provided by the web server 50. If at least one of the plurality of web services included in the list is selected, the processor 190 may set the selected web service as the service to be transmitted to the IoT device 200.

The processor 190 may control the communication circuitry of the communicator 180 to transmit information on an address corresponding to the set web service (for example, URL information) to the external IoT device 200. In this case, the IoT device 200 may connect to the web server 50 based on the transmitted address information and download script information corresponding to the web service.

In addition, if an IoT device senses a predetermined state based on script information and requests a web service from the web server 50, the processor 190 may receive a web service request from the web server 50 through the communication circuitry of the communicator 110. In this case, the processor 190 may control a display to display a UI regarding the web service which is performed in response to the request. For example, if the web service is a product purchase service, the processor 190 may control the display to display a purchase UI to perform the product purchase service in response to the request.

If the IoT device 200 senses a predetermined state based on the script information, the processor 190 may control the communication circuitry of the communicator 110 to receive URL information corresponding to the predetermined state from the IoT device 200 so as to provide a web service based on the received URL information. For example, if the IoT device 200 is a refrigerator and the IoT device 200 senses that there is no water, the processor 190 may control the communication circuitry of the communicator 110 to receive URL information regarding a web site for purchasing water from the IoT device 200 to provide a web service based on the URL information.

If a button on the IoT device 200 is selected, the IoT device 200 may transmit a product purchase request corresponding to the button to the web server 50 or the user terminal device 100 based on script information. In this example, the processor 190 may control the communication circuitry of the communicator 110 to receive information regarding the product purchase request from the web server 50 or the IoT device 200 in order to provide the received information regarding the product purchase request.

If the IoT device 200 is sensed, the processor 190 may control a display to display information regarding the sensed IoT device 200 in the form of pop-up.

Figure 3:
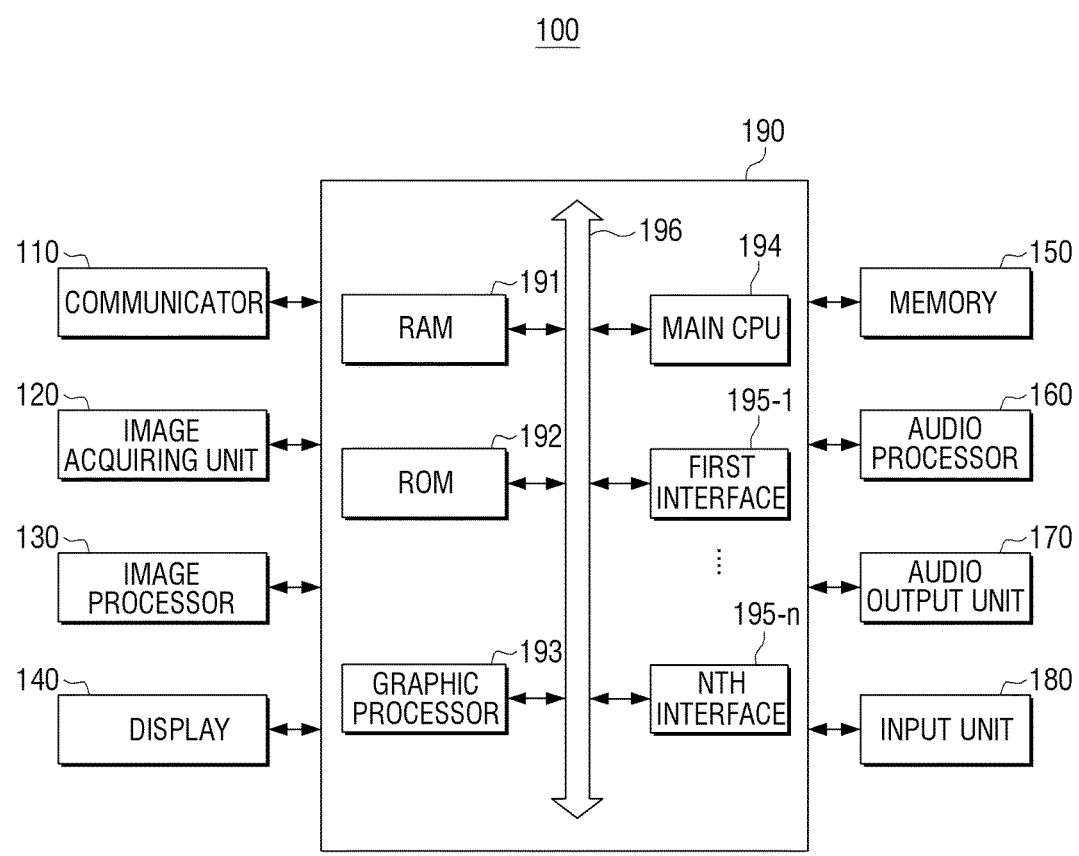
FIG. 3 is a block diagram illustrating an example configuration of a user terminal device according to an example embodiment.

FIG. 3 is a block diagram illustrating an example configuration of the user terminal device 100 according to an example embodiment. As illustrated in FIG. 3, the user terminal device 100 includes the communicator (e.g., including communication circuitry) 110, an image acquiring unit (e.g., including image acquiring circuitry) 120, an image processor 130, a display 140, a memory 150, an audio processor 160, an audio output unit 170, the input unit (e.g., including input circuitry) 180 and the processor 190. The configuration of the user terminal device 100 illustrated in FIG. 3 is only an example, and is not limited to that of FIG. 3. Depending on the type or purpose of the user terminal device 100, part of the configuration of the user terminal device 100 illustrated in FIG. 3 may be omitted, changed, or added.

The communicator 110 includes various communication circuitry configured to perform communication with various types of external apparatuses according to various types of communication methods. The communicator 110 may include various communication circuitry, such as, for example, and without limitation, at least one of Wi-Fi chip, Bluetooth chip, wireless communication chip, and NFC chip. The processor 190 may perform communication with the external web server 50 or various IoT devices 200 using the communication circuitry of the communicator 110.

In particular, the WiFi chip and the Bluetooth chip may perform communication according to a WiFi method and a Bluetooth method, respectively. When the WiFi chip or the Bluetooth chip is used, a variety of connectivity information such as SSID and a session key may be transmitted and received first, and communication is established using the connectivity information, and then a variety of information may be transmitted and received. The wireless communication chip may refer, for example, to communication circuitry including a chip which performs communication according to various communication standards such as IEEE, Zigbee, 3$^{rd}$ Generation (3G), 3$^{rd}$ Generation Partnership Project (3GPP), Long Term Evolution (LTE), etc. An NFC chip 144 refers to a chip which operates according to the NFC method using a band of 13.56 MHz from among various RF-ID frequency bands such as 135 kHz, 13.56 MHz, 433 MHz, 860~960 MHz, 2.45 GHz, etc. In addition, the communicator 110 may include two or more communication chips.

The image acquiring unit 120 may acquire image data through various sources. For example, the image acquiring unit 120 may receive image data from an external server, and receive image data from a device which is disposed outside the user terminal device 100.

In addition, the image acquiring unit 120 may acquire image data by photographing an external environment. For example, the image acquiring unit 120 may include image acquiring circuitry, such as, for example, and without limitation, a camera which photographs an external environment of the user terminal device 100. In this example, the image acquiring unit 120 may include a lens (not illustrated) where an image is transmitted and an image lens (not illustrated) which senses the image transmitted through the lens. The image sensor (image) may be implemented as a CCD image sensor or a CMOS image sensor. The image data which is acquired through the image acquiring unit 120 may be processed by the image processor 130.

The image processor 130 processes image data which is received by the image acquiring unit 120. The image processor 130 may perform various image processing with respect to image data, such as decoding, scaling, noise filtering, frame rate conversion, resolution conversion, etc.

The display 140 displays on a display area at least one of a video frame which is generated by processing image data by the image processor 130 or various screens generated by a graphic processor 193.

The display 140 may have various sizes. For example, the display 140 may be provided in the sizes of 3 inch, 4 inch, 4.65 inch, 5 inch, 6.5 inch, 8.4 inch, etc. The display 140 may consist of a plurality of pixels. In this case, (the number of pixels in the horizontal direction)*(the number of pixels in the vertical direction) of the plurality of pixels may be represented as resolution. For example, the display 140 may have resolution of 320*320, 360*480, 720*1280, 1280*800, 3940*2160, etc.

The display 140 may be provided in the form of flexible display and may be combined to at least one of a front, a side and rear of the user terminal device 100. The flexible display may be curved, bent or rolled without any damage through a thin and flexible substrate like a paper. Such a flexible display may be manufactured using not only a glasses substrate which is used generally but also a plastic substrate. If a plastic substrate is used, in order to prevent any damage on the substrate, a low-temperature manufacturing processor may be used instead of the existing processor. In addition, the glasses substrate wrapping flexible liquid crystal may be replaced with a plastic film which is flexible enough to be folded and unfolded. Such a flexible display is not only thin and light but also impact-resistant but also curved or bent and thus, may be produced in various forms.

The display 140 be implemented as a touch screen having a layer structure by being combined with a touch sensor. The touch screen may have a display function and the function of detecting a touch input pressure as well as a touch input location and a touched area and also, may have the function of detecting a proximity touch as well as a real touch. In addition, the touch screen may have the function of detecting not only a user's finger touch but also a touch of various types of pens.

The memory 150 may store various programs and data which are required to operate the user terminal device 100. For example, the memory 150 may store software including a base module, a sensing module, a communication module, a presentation module, a web browser module, and a service module. In this case, the base module refers to a basic module which processes a signal transmitted from each hardware included in the user terminal device 100 and transmits the processed signal to an upper layer module. The sensing module is a module which collects information from various sensors, and analyzes and manages the collected information, and may include a face recognition module, a voice recognition module, a motion recognition module, an NFC recognition module and so on. The presentation module is a module to compose a display screen, and may include a multimedia module to play and output a multimedia content and a UI rendering module which performs UI and graphic processing. The communication module is a module for performing communication with an external device. The web browser module refers to a module which performs web browsing and accesses a web server. The service module is a module including various applications to provide various services.

The memory 150 may be implemented as non-volatile memory, volatile memory, flash memory, hard-disk drive (HDD), sold state drive (SSD), etc. The memory 150 is accessed by the processor 190, and reading/recording/editing/deleting/updating, etc. of data may be performed by the processor 190. The term of memory in the present disclosure may include the memory 150, a ROM 192 of the processor 190, a RAM 191 or a memory card (not illustrated) mounted on the user terminal device 100 (for example, a micro SD card, a memory stick).

In addition, the memory 150 may store programs, data, etc. for composing various screens to be displayed on a display area of the display 140.

As described above, the memory 150 may include various programs modules, but the program modules may be omitted, changed, or some program modules may be added depending on the type and characteristics of the user terminal device 100. For example, if the user terminal device 100 is realized as a tablet PC, the base module may further include a location determination module for determining a GPS-based location, and the sensing module may further include a sensing module for sensing a user's motion.

The audio processor 160 processes audio data of an image content. The audio processor 160 may perform various processing with respect to audio data, such as decoding, amplification, noise filtering, etc. The audio data processed by the audio processor 160 may be output to the audio output unit 170.

The audio output unit 170 outputs not only various audio data for which various processing such as decoding, amplification or noise filtering is performed by the audio processor 160 but also various alarm sounds or voice messages. In particular, the audio output unit 170 may be implemented as a speaker, but this is only an example. The audio output unit 170 may be implemented as an output terminal for outputting audio data.

The input unit 180 includes various input circuitry configured to receive various user commands. In particular, the input unit 180 may include various sensors, and may include at least one of all types of sensing electronic devices which can detect the change of state of the user terminal device 100. For example, the input unit 180 may include input circuitry, such as, for example, and without limitation, at least one of touch sensor, acceleration sensor, gyro sensor, illuminance sensor, proximity sensor, pressure sensor, noise sensor (microphone), video sensor (for example, camera module), pen sensor, timer, etc.

In addition, the input unit 180 may include various input circuitry including devices such as key pad, button, mouse, keyboard, and pointing device.

The processor 190 (or processor) may control the overall operations of the user terminal device 100 using various programs stored in the memory 150.

The processor 190 may include a RAM 191, a ROM 192, a graphic processor 193, a main CPU 194, first to n-th interfaces 195-1 to 195-n, and a bus 196. In this case, the RAM 191, the ROM 192, the graphic processor 193, the main CPU 194, and the first to n-th interfaces 195-1 to 195-n may be connected with one another via the bus 196.

The RAM 191 stores an O/S and an application program. Specifically, the RAM 191 may store the O/S when the user terminal device 100 is booted, and various application data selected by a user may be stored in the RAM 191.

The ROM 192 stores a set of commands for booting a system. In response to a turn on command being inputted and power being supplied, the main CPU 194 may copy the O/S stored in the memory 150 into the RAM 191 according to a command stored in the ROM 192, and boot the system by executing the O/S. In response to the booting being completed, the main CPU 194 may copy various application programs stored in the memory 150 into the RAM 191, and perform various operations by executing the application programs copied into the RAM 191.

The graphic processor 193 may generate a screen including various objects such as an icon, an image, a text, etc., using a calculator (not shown) and a renderer (not shown). The calculator (not shown) may calculate attribute values of objects to be displayed according to a layout of the screen, such as a coordinate value, a shape, a size, a color, etc., based on a control command received from the sensing unit 180. The renderer (not shown) may generate the screen of various layouts including objects based on the attribute values calculated by the calculator (not shown). The screen generated by the renderer (not shown) may be displayed in the display area of the display 140.

The main CPU 194 may access the memory 150 and perform booting using the O/S stored in the memory 150. In addition, the main CPU 194 may perform various operations using various programs, content, data, etc. which are stored in the memory 150.

The first to n-th interfaces 195-1 to 195-n may be connected with the above-described various elements. One of the first to n-th interfaces 195-1 to 195-n may be a network interface which is connected with an external device via a network.

In this example, the processor 190 may be realized as ARM processor, Qualcomm® Snapdragon™, Samsung Exynos™, etc.

Hereinafter, various example embodiments will be described with reference to FIGS. 4A to 10.

Figure 4A:
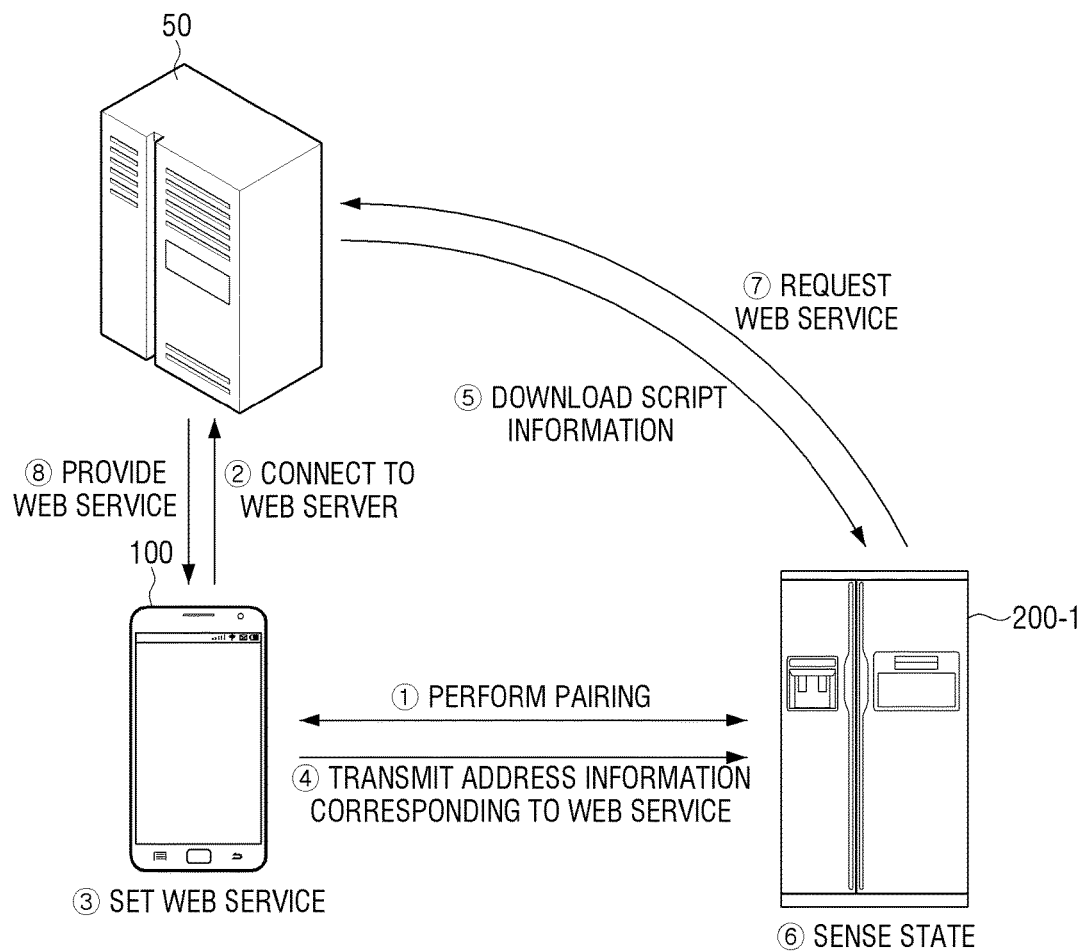
FIGS. 4A, 4B, 5, 6A-6E, 7A, 7B, 8A, 8B, 9 and 10 are diagrams illustrating an example method for providing a web service and a UI for performing the method according to various example embodiments.
Figure 4B:
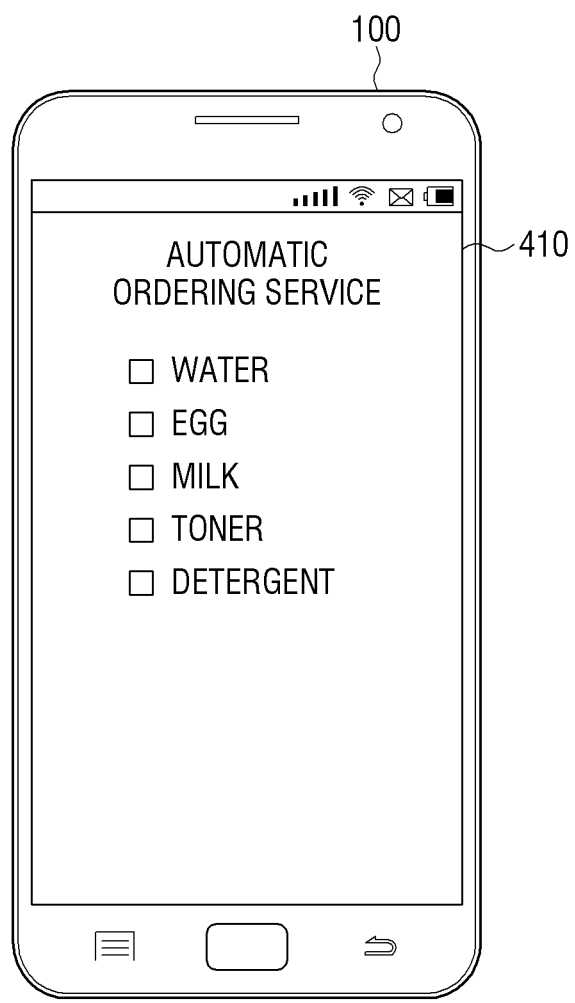

FIGS. 4A and 4B are diagrams illustrating an example embodiment where the IoT device 200 requests the web server 50 to provide a web service. Meanwhile, as set forth in the example illustrated in FIG. 4A, the user terminal device 100 may be a smart phone, and the IoT device 200 may be a refrigerator 200-1.

The user terminal device 100 may perform pairing with the IoT device 200. In this example, if the user has been paired with the IoT device 200-1, the user terminal device 100 may omit the pairing process.

The user terminal device 100 connects to the web server 50 which provides a web service. In this example, the web server 50 may be a server which provides a product purchase service.

The user terminal device 100 may set at least one of a plurality of web services provided by the web server 50 as a web service according to a user input.

For example, if the user terminal device 100 connects to the web server 50, the user terminal device 100 may display a list 410 for setting a web service as illustrated in FIG. 4B. In this case, the list 410 may include a plurality of items for a user to set items to be purchased automatically. For example, if a user selects water and milk, the user terminal device 100 may set a water automatic ordering service and a milk automatic ordering service as web services that the user wishes to be provided with.

The user terminal device 100 may acquire address information corresponding to a set web service. In this example, the user terminal device 100 may acquire address information corresponding to a set web service from the web server 50, but this is only an example. The user terminal device 100 may acquire address information corresponding to the web service through pre-stored address information. For example, the address information corresponding to the web service may be URL information through which script information to perform the web service can be downloaded.

In addition, the user terminal device 100 may determine the IoT device 200 for performing a web service based on a set web service. For example, in the case of a water automatic ordering service or a milk automatic ordering service, the user terminal device 100 may determine a refrigerator 200-1 as an IoT device to perform the web service. Alternatively, if the web service is a toner automatic ordering service, the user terminal device 100 may determine a printer as an IoT device to perform the web service. If the web service is a detergent automatic ordering service, the user terminal device 100 may determine washing machine as an IoT device to perform the web service.

The user terminal device 100 may transmit address information corresponding to a set web service to the IoT device 200.

The IoT device 200 may connect to the web server 50 to download script information based on the address information and download the script information. Here, the script information may include data to perform a web service.

For example, the script information may include conditions to execute a service, action information corresponding to the conditions, user's log-in information, user authorization information, etc. For example, if the web service is a water automatic ordering service, the script information may store condition information to perform the service, information regarding "sensing whether there is water in a refrigerator" and action corresponding to the condition information, information regarding "a command to order water automatically and URL to order water automatically." In this example, the IoT device 200 may download the script information through another server instead of the web server 50. In addition, the script information may be provided in the form of web application (for example, application written in Java script, etc.) or rule set definition file (when a specific value is sensed, information to be set for performing the specific function, xml, etc.).

The IoT device 200 senses the state of the IoT device 200 using various sensors. For example, if the IoT device 200 is a refrigerator and a web service is a water automatic ordering service and a milk automatic ordering service, the IoT device 200 may sense whether there are water and milk in the refrigerator through, for example, a camera sensor, an infrared ray sensor, etc.

If the IoT device 200 senses a specific state (for example, a state where there is no water in the refrigerator), the IoT device 200 loads script information and request the web server 50 to provide a web service (for example, a water automatic ordering service).

In this example, the web server 50 may perform the web service immediately in response to the request for the web service, but this is only an example. The web server 50 may provide the web service to the user terminal device 100. In other words, when the water automatic ordering request is received, the web server 50 may perform the water automatic ordering service immediately, or may provide the water automatic ordering service to the user terminal device 100 to perform the water automatic ordering service after user confirmation. In this example, the user terminal device 100 may display a UI for performing the water automatic ordering service.

Meanwhile, in the above-described example embodiment, it is assumed that the IoT device 200 is a refrigerator, and the web service is the water automatic ordering service and the milk automatic ordering service, but this is only an example. The technical feature of the present disclosure may be applied to various IoT devices and web service. For example, if the IoT device 200 is washing machine, the web service may be a detergent automatic ordering service, and if the IoT device 200 is a printer, the web service may be a ink cartridge automatic ordering service, etc.

Figure 5:
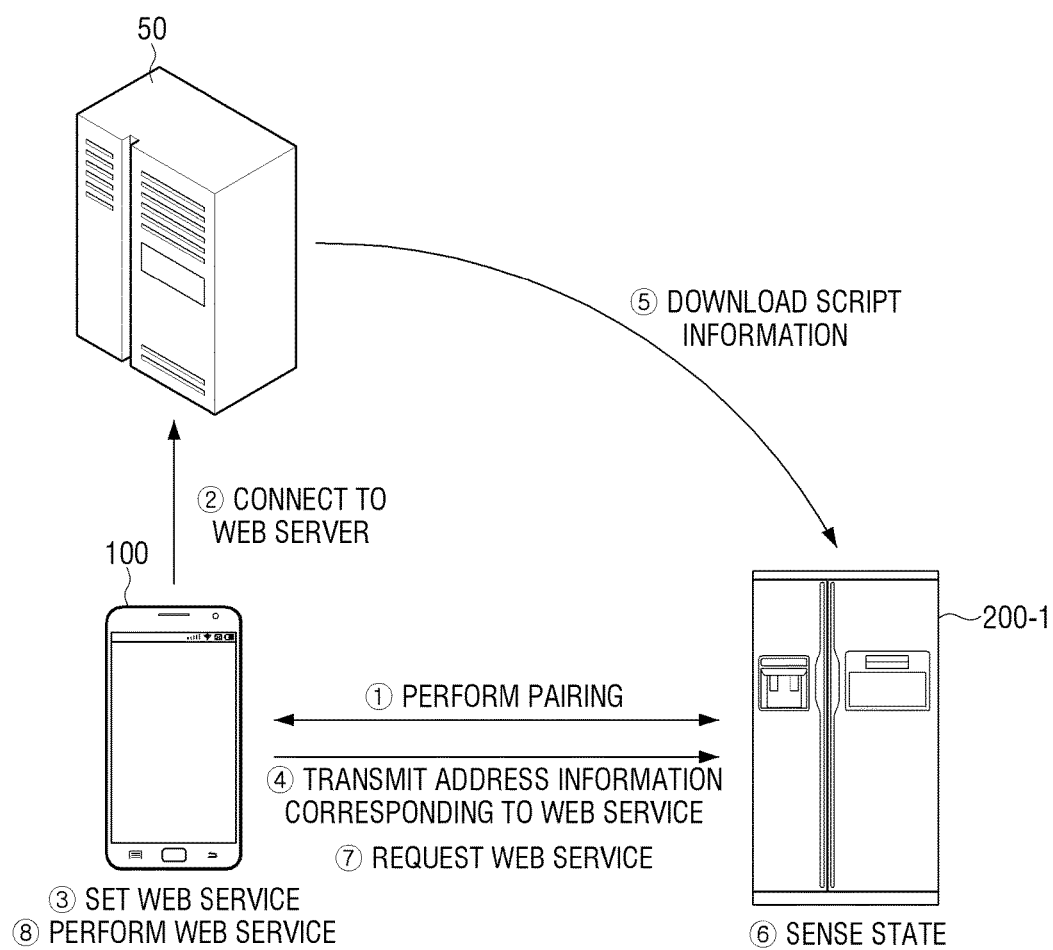

FIG. 5 is a diagram illustrating an example embodiment where the IoT device 200 requests the user terminal device 100 to provide a web service. As illustrated in FIG. 5, the user terminal device 100 may be a smart phone, and the IoT device 200 may be a refrigerator 200-1.

The user terminal device 100 may perform pairing with the IoT device 200. In this example, if the IoT device 200 has been paired previously, the user terminal device 100 may omit the pairing process.

The user terminal device 100 connects to the web server 50 which provides a web service. In this example, the web server 50 may be a server which provides a product advertisement service.

The user terminal device 100 may set at least one web service from among a plurality of web services provided by the web server 50 as the web service that a user wishes to be provided with based on a user input. For example, the user terminal device 100 may set a late-night meal advertisement service based on a user input.

The user terminal device 100 may acquire address information corresponding to the set web service through the web server 50. For example, the address information corresponding to the web service may be URL information through which script information to perform the web service can be downloaded.

The user terminal device 100 may determine the IoT device 200 which is to perform the web service based on the set web service. For example, if the web service is a late-night meal advertisement service, the user terminal device 100 may determine a refrigerator as an IoT device to perform the web service.

The user terminal device 100 may transmit address information corresponding to the set web service to the IoT device 200.

The IoT device 200 may connect to the web server 50 to download script information based on the address information and download the script information. If the web service is a late-night meal advertisement service, the script information may store the state where a user needs a late-night meal (for example, when sensing that the user opens the door of the refrigerator after 11:00 p.m.) matching with URL information for a late-night meal advertisement.

The IoT device 200 senses the state of the IoT device 200 using various sensors. For example, if the IoT device 200 is a refrigerator and the web service is a late-night meal advertisement service, the IoT device 200 may determine whether the user opens the door of the refrigerator at a predetermined time period.

If the IoT device 200 senses a specific motion (for example, the motion of opening the door of the refrigerator at 11 o'clock), the IoT device 200 may load a script and request for a web service from the user terminal device 100. In this example, the IoT device 200 may transmit URL information for a late-night meal advertisement to the user terminal device 100 through a beacon signal. In this case, the IoT device 200 may receive updated URL information for a late-night meal advertisement from the web service 50 before transmitting a beacon signal and transmit the information to the user terminal device 100.

The user terminal device 100 may provide a late-night meal service according to the received beacon signal.

Figure 6A:
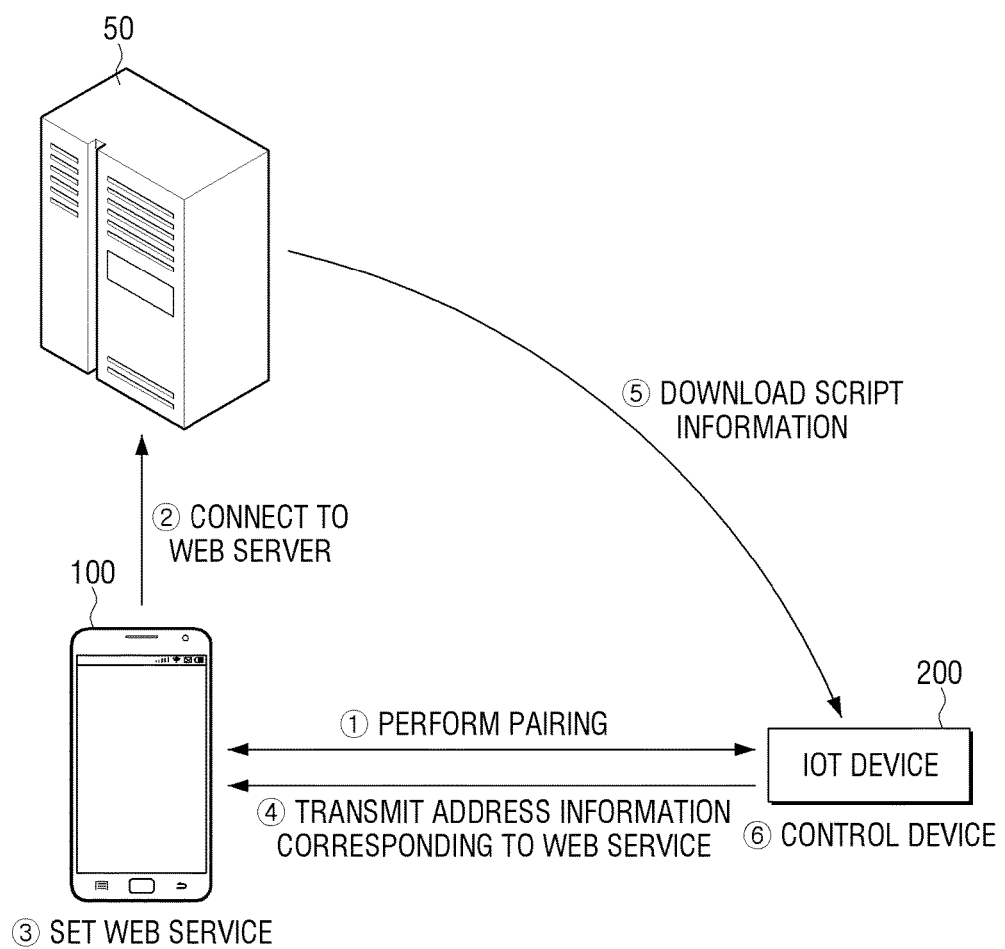
Figure 6B:
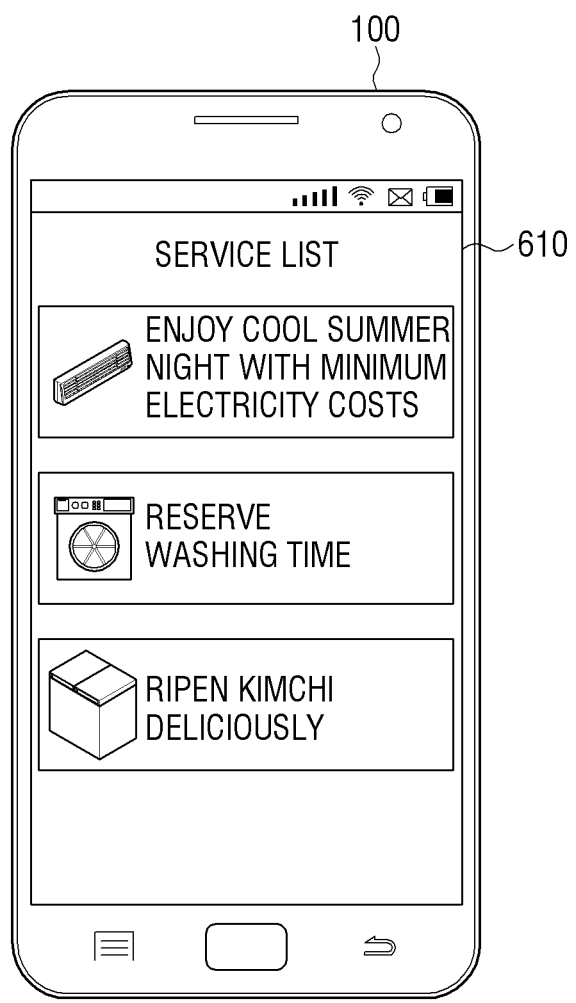
Figure 6C:

FIGS. 6A to 6C are diagrams illustrating an example embodiment where the IoT device 200 performs a web service directly. As illustrated in FIG. 6A, the user terminal device 100 may be a smart phone, and the IoT device 200 may be an air conditioner.

First of all, the user terminal device 100 may perform pairing with the IoT device 200. In this example, if the IoT device 200 has been paired previously, the user terminal device 100 may omit the pairing process.

The user terminal device 100 connects to the web server 50 which provides a web service. In this example, the web server 50 may be a server which provides an IoT device control service.

The user terminal device 100 may set at least one service from among a plurality of web services provided by the web server 50 as the web service that a user wishes to be provided with based on a user input. According to an example embodiment, the user terminal device 100 may receive a list 610 as illustrated in FIG. 6B from the web server 50 and display the list 610. In this example, the services included in the list may be an IoT device control service which may be difficult for a user to set directly or at every time that the user wishes to use it. If a UI element such as "enjoy cool summer night with minimum electricity costs" is selected while a list such as the list illustrated in FIG. 6B is displayed, the user terminal device 100 may set an air conditioner control service as the web service that the user wishes to be provided with.

The user terminal device 100 may acquire address information corresponding to the set web service through the web server 50. For example, the address information corresponding to the set web service may be URL information through which script information to perform the web service can be downloaded.

In addition, the user terminal device 100 may determine the IoT device 200 to perform the web service based on the set web service. For example, if the set web service is an air conditioner control service, the user terminal device 100 may determine an air conditioner as the IoT device to perform the web service.

The user terminal device 100 may transmit the address information corresponding to the set web service to the IoT device 200.

The IoT device 200 may connect to the web server 50 to download script information based on the address information and download the script information. If the web service is an air conditioner control service, the script information may also store air conditioner control information. For example, if the web service is an air conditioner control service, the script information may include various air conditioner setting information such as temperature setting information, humidity setting information, wind strength setting information, wind direction setting information, etc.

The IoT device 200 may load script information and control a function of the IoT device 200. For example, the IoT device 200 may operate based on air conditioner setting information included in the script information.

In the above-described example embodiment, a user uses the list 610 received from the web server 50 to set a web service, but this is only an example. A user may set a web service in another way.

According to an example embodiment, the user terminal device 100 may set a web service based on schedule information input to the user terminal device 100. For example, as illustrated in FIG. 6C, if device control information such as "Start Washer" is included in the schedule information 620, the user terminal device 100 may analyze the schedule information and set a web service to control the IoT device 200 at the corresponding time. In other words, if schedule information as illustrated in FIG. 6C is input, the user terminal device 100 may set a reserved washing service as the service that the user wishes to be provided with.

Figure 6D:
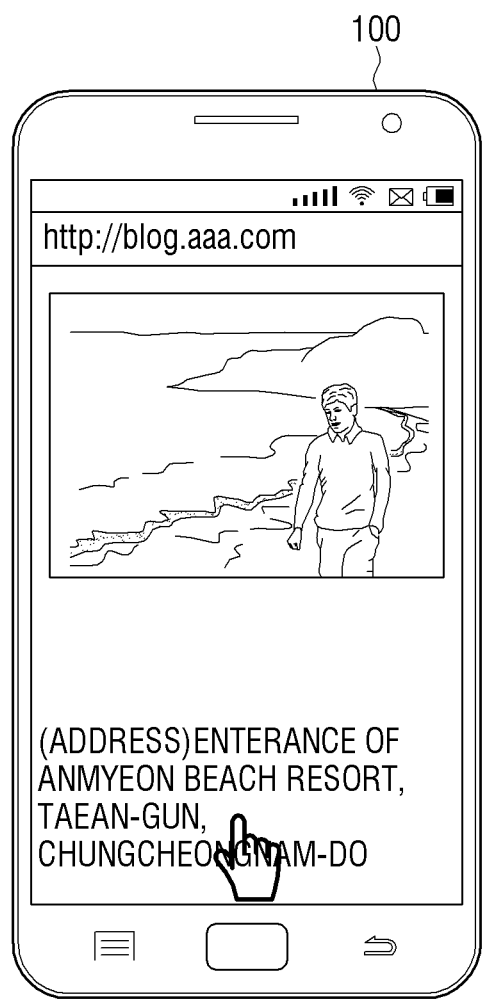
Figure 6E:
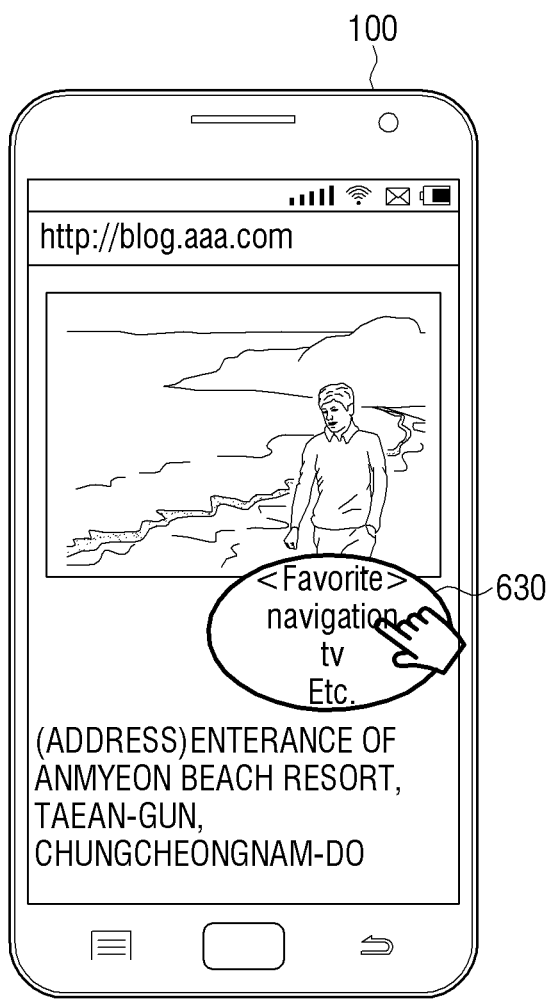

According to another example embodiment, the user terminal device 100 may set a web service based on various information displayed on the user terminal device 100. For example, as illustrated in FIG. 6D, if a user command to select an address is input while the address is displayed on a web page, the user terminal device, as illustrated in FIG. 6E, may display a list 630 for selecting external devices to receive the address. If the navigation is selected from the list 630, the user terminal device 100 may set a destination setting service to set the address selected in the navigation as the destination as the service the user wishes to be provided with.

Figure 7A:
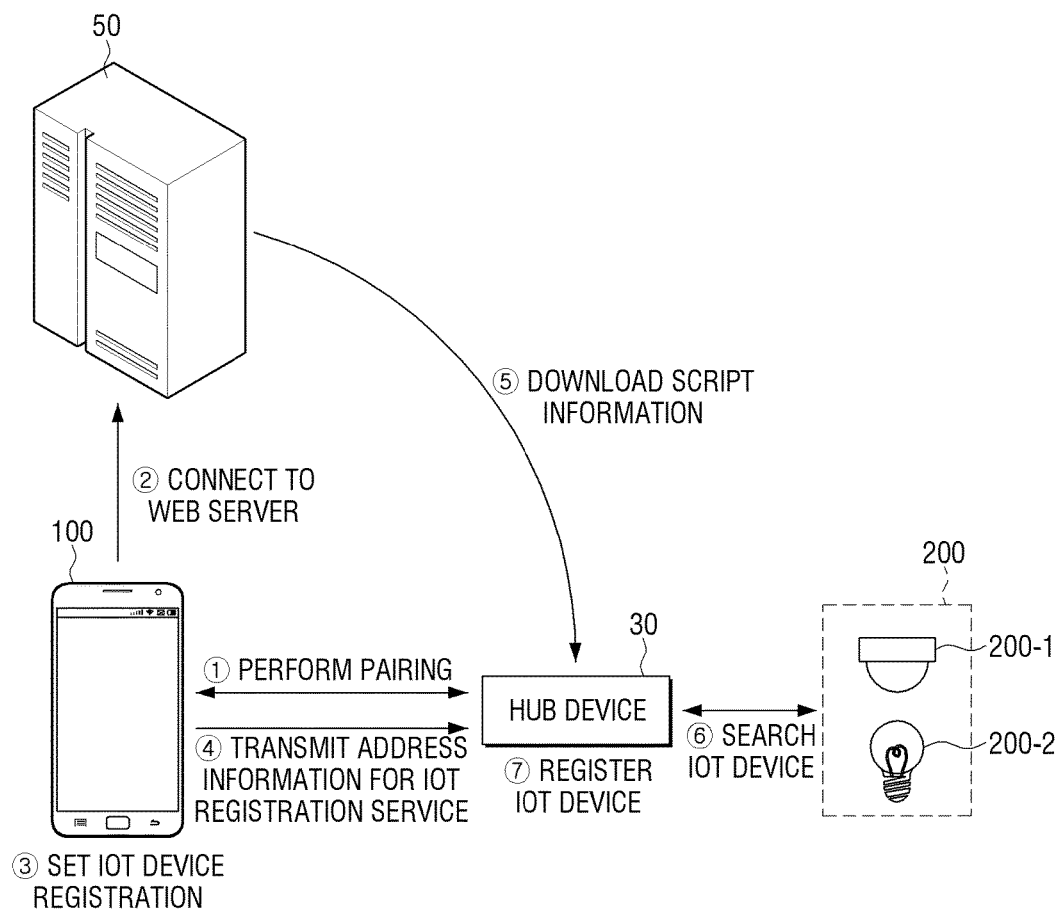
Figure 7B:
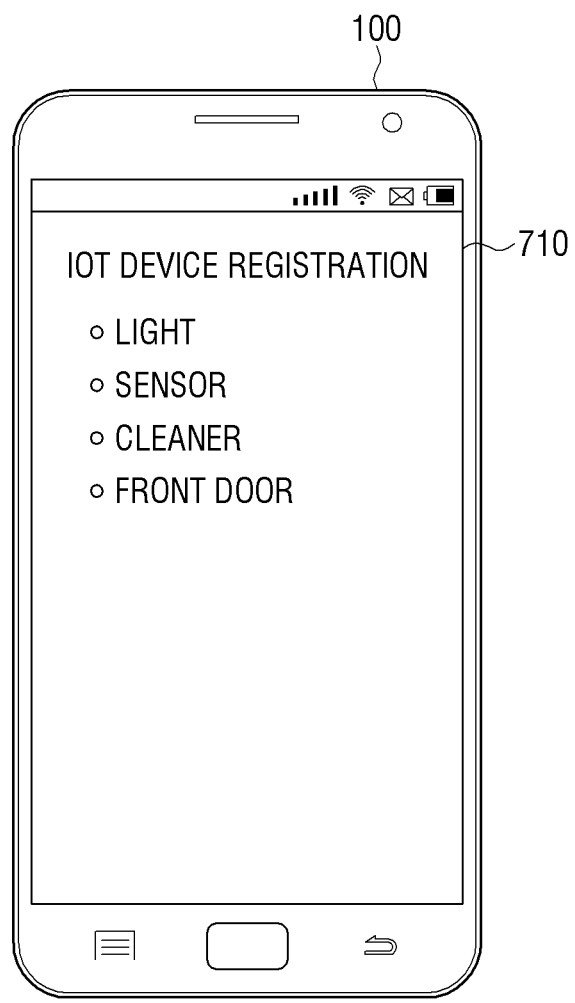

FIGS. 7A and 7B are diagrams illustrating an example embodiment of registering the IoT device 200 in order to control the IoT device 200 through the hub device 30. As illustrated in FIG. 7A, the user terminal device 100 may be a smart phone, and the IoT device 200-1, 200-2 may include a sensor, a light, etc. In this case, the IoT device 200-1, 200-2 may be a low-specification IoT device which provides only a local network function, has a small storage space or has no display function. The hub device 30 may be implemented as a separate element such as a home gateway, but this is only an example. The hub device 30 may be implemented as the high-specification IoT device 200 such as a smart TV.

The user terminal device 100 performs pairing with the hub device 30. In this example, if the hub device 30 has been paired previously, the user terminal device 100 may omit the pairing process.

The user terminal device 100 connects to the web server 50. In this example, the user terminal device 100 may receive a list for registering the IoT device 200-1, 200-2 from the web server 50 and display the list. For example, as illustrated in FIG. 7B, the user terminal device 100 may display a list 710 including a plurality of IoT devices.

If at least one IoT device is selected through the list 710, the user terminal device 100 may set the selected IoT device 200 as the IoT device to be registered in the hub device 30. For example, if the sensor 200-1 and the light 200-2 are selected through the list 710, the user terminal device 100 may set the sensor 200-1 and the light 200-2 as the IoT device to be registered in the hub device 30.

The user terminal device 100 may transmit address information for an IoT registration service to register the selected IoT device in the hub device to the hub device 30.

The hub device 30 may connect to the web server 50 and download information (or a protocol) for the IoT registration service. The hub device 30 may search the selected IoT devices 200-1, 200-2 using the downloaded information and register the searched IoT devices 200-1, 200-2.

Figure 8A:
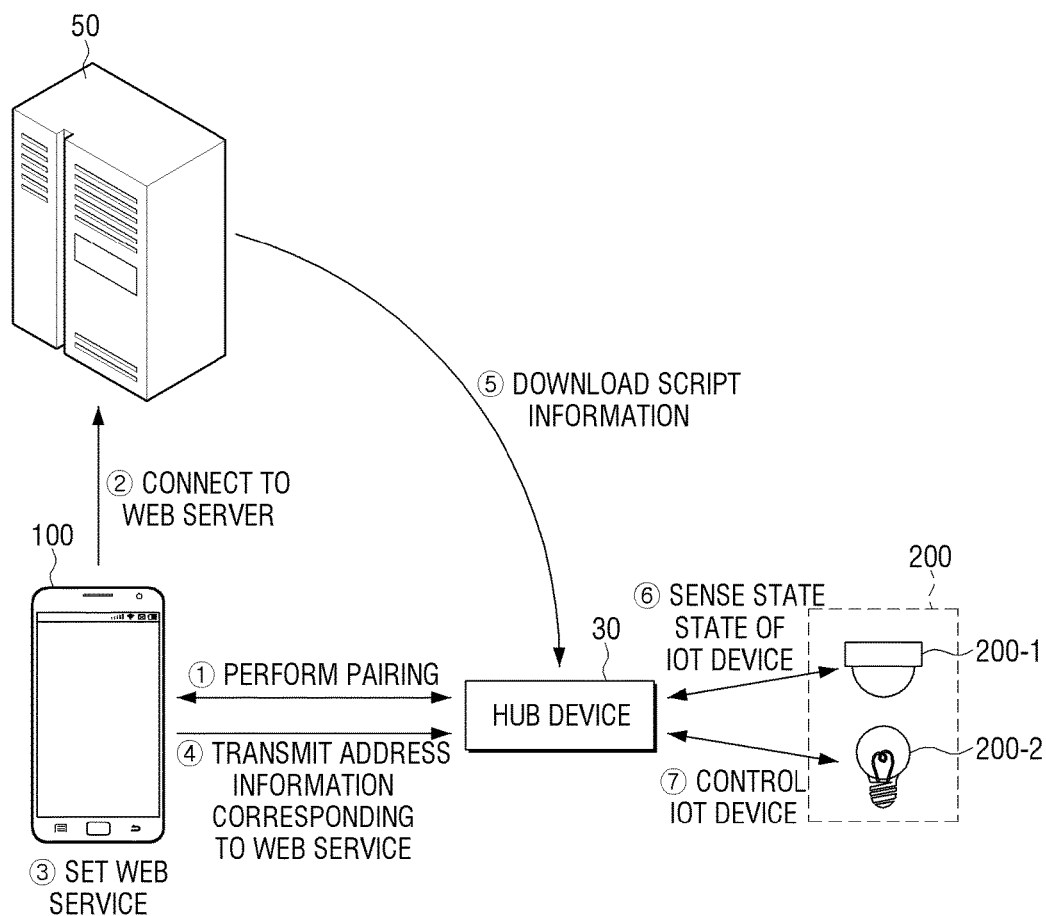
Figure 8B:
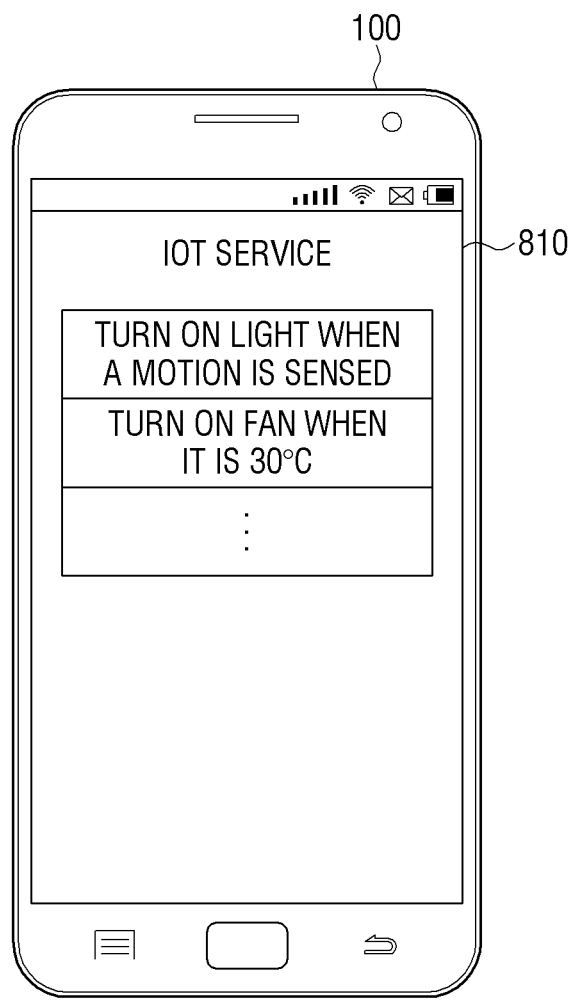

FIGS. 8A and 8B are diagrams illustrating an example embodiment where the hub device 30 senses the state of the IoT device 200 and requests the web server 50 to provide a web service.

The user terminal device 100 may perform pairing with the hub device 30. In this example, if the hub device 30 has been paired previously, the user terminal device 100 may omit the pairing process.

The user terminal device 100 connects to the web server 50 which provides a web service. In this case, the web server 50 may be a server which provides an IoT device control service.

The user terminal device 100 may set at least one web service from among a plurality of web services provided by the web server 50 as the web service that a user wishes to be provided with based on a user input.

For example, if the user terminal device 100 connects to the web server 50, as illustrated in FIG. 8B, the user terminal device 100 may display a list 810 for setting a web service. In this example, a list 810 may include an IoT device control service that the user wishes to control automatically. For example, if the IoT device control service, "turn on light when a motion is sensed", is selected, the user terminal device 100 may set a light control service as a web service that the user wishes to be provided with.

The user terminal device 100 may acquire address information corresponding to the set web service. In this example, the user terminal device 100 may acquire address information corresponding to the web service from the web server 50, but this is only an example. The user terminal device 100 may acquire address information corresponding to a web service through pre-stored address information. For example, the address information corresponding to a web service may be URL information through which script information to perform the web service can be downloaded.

The user terminal device 100 may transmit the address information corresponding to the set web service to the hub device 30.

The hub device 30 may connect to the web server 50 to download script information based on address information and download the script information. For example, the script information may be information including data to perform a web service. For example, the script information may store state information for the IoT device 200 to perform a web service and information matching a web service corresponding to the state information. For example, if the web service is a light control service, the script information may store information where information regarding sensing a motion is matched with a control command to turn on the light. In this case, the IoT device 200 may download the script information through another server, not the web server 50.

The hub device 30 acquires state information of the IoT device. For example, the hub device 30 may receive sensing information (information regarding whether a user motion is sensed) from the sensor 200-1 while the light is turned off.

If the hub device 30 acquires information regarding a specific state, the hub device 30 may load script information and perform an IoT device control service corresponding to the specific state. For example, if the sensor 200-1 acquires information where the sensor 200-1 senses a user motion while the light is turned off, the hub device 30 may transmit a control command to turn on the light 200-2 to the light 200-2.

In the above-example embodiment, the web service set by a user performs an IoT control service, but this is only an example. The hub device 30 may provide various services such as a product purchase service, a product advertisement service, etc.

Figure 9:
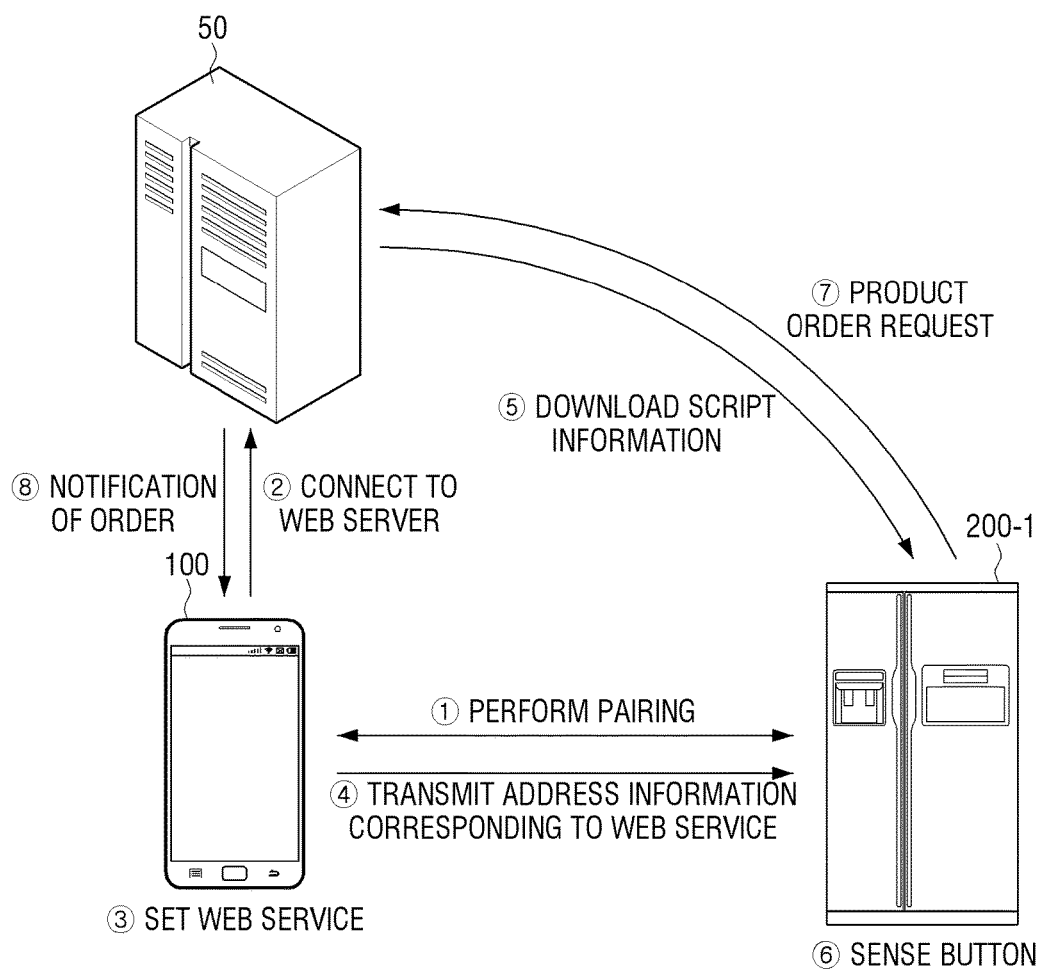

FIG. 9 is a diagram illustrating an example embodiment where a web service is provided using a button on the IoT device 200 according to an example embodiment. In FIG. 9, it is assumed by way of example that the user terminal device 100 is a smart phone and the IoT device 200 is a refrigerator.

The user terminal device 100 may perform pairing with the IoT device 200. In this case, if the IoT device 200 has been paired previously, the user terminal device 100 may omit the pairing process.

The user terminal device 100 connects to the web server 50 which provides a web service. In this example, the web server 50 may be a server which provides a product purchase service.

The user terminal device 100 may set at least one of a plurality of web services provided by the web server 50 as the web server that a user wishes to be provided with.

For example, if the user terminal device 100 connects to the web server 50, as illustrated in FIG. 4B, the user terminal device 100 may display the list 410 for setting a web service. In this example, the list 410 may include a plurality of items for setting an item that a user wishes to order automatically. For example, if a user selects water and milk, the user terminal device 100 may set a water automatic ordering service and a milk automatic ordering service as the web service that the user wishes to be provided with.

The user terminal device 100 may acquire address information corresponding to the web service from the web server 50.

In addition, the user terminal device 100 may determine the IoT device 200 to perform a web service based on the set web service. In this example, the IoT device 200 for performing a web service is a device where a button is installed and the user terminal device 100 may determine the device where a button is installed automatically, but this is only an example. The user terminal device 100 may determine a device where a button is installed based on a user input.

The user terminal device 100 may transmit address information corresponding to the set web service to the IoT device 200.

The IoT 200 may connect to the web server 50 to download script information based on the address information and download the script information. For example, the script information may be information including data to perform a web service. For example, the script information may store information regarding a web service which is performed in response to the IoT device 200 selecting a button. For example, if the web service is a water automatic ordering service, the script information may store URL information for ordering water automatically when the button is selected. In this case, the IoT device 200 may download the script information through another server, not the web server 50.

The IoT device 200 may determine whether a button selection is sensed. If the button is selected, the IoT device 200 loads the script information and requests a web service (for example, a water automatic ordering service) from the web server 50. In other words, the IoT device 200 may transmit a product ordering request to the web server 50.

In this example, the web server 50 may perform a product ordering service immediately in response to the product ordering request. The web server 50 may transmit an order notification to the user terminal device 100, and the user terminal device 100 may display the order notification information.

Figure 10:
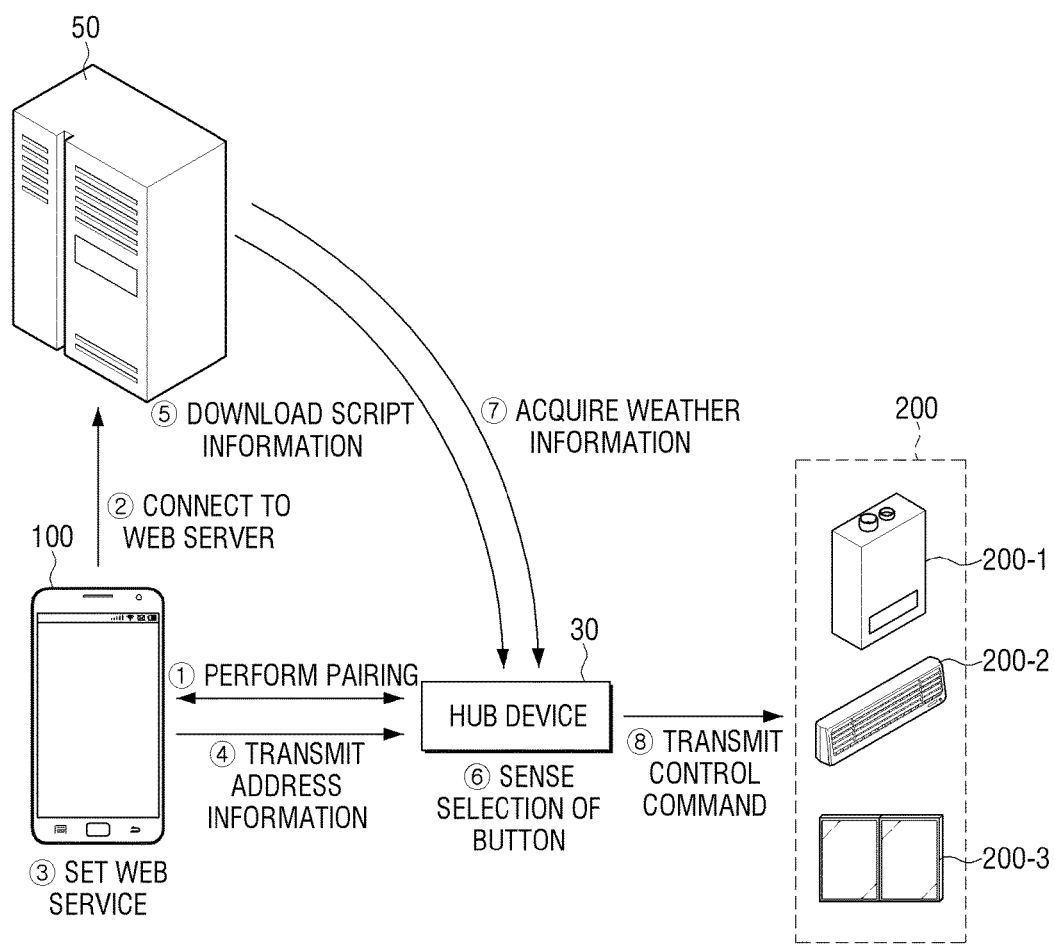

FIG. 10 is a diagram illustrating an example embodiment where a web service is provided using a button on the hub device 30 according to an example embodiment. In FIG. 10, the user terminal device 100 may be a smart phone, and the IoT device 200 may be a boiler 200-1, an air conditioner 200-2 and a window 200-3.

The user terminal device 100 may perform pairing with the hub device 30. In this example, if the hub device 30 has been paired previously, the user terminal device 100 may omit the pairing process.

The user terminal device 100 connects to the web server 50 which provides a web service. The user terminal device 100 may set at least one of a plurality of web services provided by the web server 50 as the web service that a user wishes to be provided with based on a user input. In this example, the user terminal device 100 may set a temperature setting service based on weather information as the web service that the user wishes to be provided with based on a user input.

The user terminal device 100 may transmit address information for downloading script information to perform the temperature setting service to the hub device 30.

The hub device 30 may download the script information from the web server 50 based on the address information.

The hub device 30 may determine whether a button selection is sensed. In this example, the button may be a button for setting temperature which is synchronized with the current weather.

When the button is selected, the hub device 30 loads a script and acquires weather information from the web server 50. In the example embodiment, the hub device 30 acquires weather information from the web server 50, but this is only an example. The hub device 30 may acquire weather information from a separate weather information providing server.

The hub device 30 may determine a temperature setting which is synchronized with the received weather information based on the script information, and transmit a control command to at least one of the boiler 200-1, the air conditioner 200-2 and the window 200-3 for the determined temperature setting. For example, if the current weather is −10° C., the hub device 30 may transmit a control command to the boiler 200-1 so that the temperature of a room becomes 20° C. For example, if it is windy, the hub device 30 may transmit a control command to close a window to the window 200-3.

According to the above-described various example embodiments, a user may be provided with various web services which are based on the web server 50 more conveniently and intuitively.

Figure 11A:
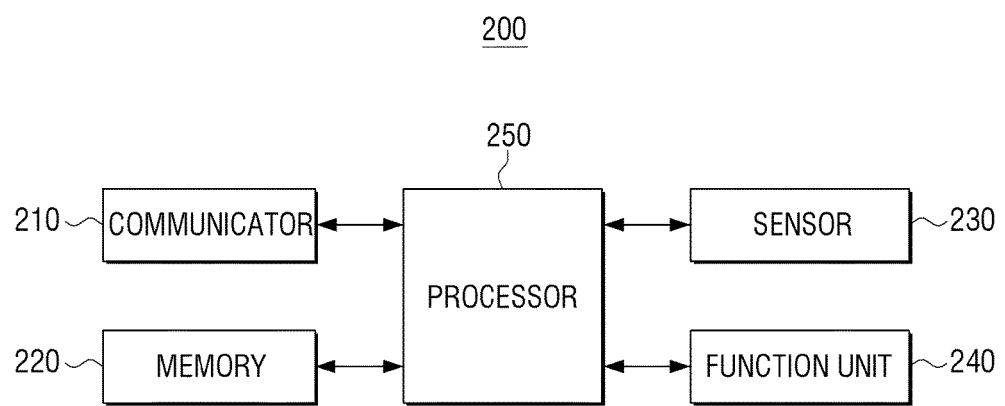
FIGS. 11A and 11B are block diagrams illustrating an example configuration of an IoT device and a server according to an example embodiment.

FIG. 11A is a block diagram illustrating an example configuration of the IoT device 200 according to an example embodiment. As illustrated in FIG. 11A, the IoT device 200 includes a communicator (e.g., including communication circuitry) 210, a memory 220, a sensor 230, a function unit 240 and a processor 250.

The communicator 210 performs communication with the external user terminal device 200, the web server 50 and the hub device 30 using various communication circuitry. For example, the communicator 210 may receive address information to download script information from the user terminal device 200. In addition, the communicator 210 may use various communication circuitry to connect to the web server 50 based on the address information and download the script information.

The communicator 210 may use various communication circuitry to perform communication with an external device using, for example, and without limitation, only a near-field local network communication module based on the type of the IoT device 200.

The memory 220 stores various data and programs to control the IoT device 200. In particular, the memory 220 may store the script information received from the web server 50. In this case, the script information may condition information to perform a web service and web service information matching according to the condition information.

The sensor 230 may sense an environment around the IoT device 200 or a user manipulation regarding the IoT device 200. In this case, the sensor 230 may include a temperature sensor, a humidity sensor, a illuminance sensor, a motion sensor, etc, but is not limited thereto.

The function unit 240 performs various functions according to the type of the IoT device 200. For example, if the IoT device 200 is a refrigerator, the function unit 240 may perform a refrigerating/freezing function, if the IoT device 200 is a printer, the function unit 240 may perform a printing function, and the IoT device 200 is an air conditioner, the function unit 240 may perform a cooling function.

The processor 250 controls the overall operations of the IoT device 200. Specifically, if address information is received from the external user terminal device 100, the processor 250 may control the communicator 210 to download script information to perform a web service based on the address information. The processor 250 may provide various web services based on the script information.

For example, if a specific state or a specific operation stored in the script information is sensed by the sensor 230, the processor 250 may load the script information and perform a web service. In this case, the processor 250 may perform a web service (for example, a IoT device control service) directly, or may request the web server 50, the user terminal device 100 or the hub device 30 to perform a web service (for example, a product advertisement service, a product purchase service, etc.).

For example, if the IoT device 200 is a refrigerator and the sensor 230 senses that there is no water, the processor 250 may request the web server 50 to provide a water automatic ordering service and request the user terminal device 100 to provide a water advertisement service.

In another example, if the IoT device 200 is a printer and the sensor 230 senses that a toner is not sufficient, the processor 250 may request the web server 50 to provide a toner automatic ordering service, and request the user terminal device 100 to provide a toner advertisement service.

Figure 11B:
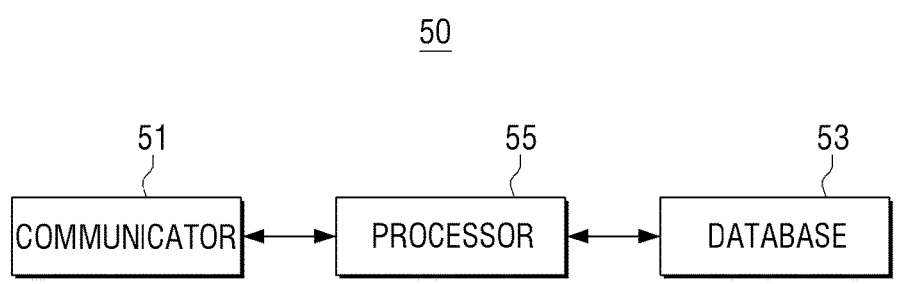

FIG. 11B is a block diagram illustrating an example configuration of the web server 50. As illustrated in FIG. 11B, the web server 50 includes a communicator (e.g., including communication circuitry) 51, a database 53 and a processor 55.

The communicator 51 uses various communication circuitry to perform communication with the external user terminal device 100 and the IoT device 200. For example, when the user terminal device 100 is connected, the communicator 51 may use various communication circuitry to transmit a list including a plurality of services provided by the web server 50. In addition, when a request for script information is received from the IoT device 200, the communicator 51 may use various communication circuitry to transmit script information to the IoT device 200.

The database 53 stores script information to provide various web services.

The processor 55 controls the overall operations of the web server 50. In particular, if a script information download request is received from the IoT device 200, the processor 55 controls the communication circuitry of the communicator 51 to provide the script information in response to the request signal.

In addition, if a web service execution request is received from the IoT device 200, the processor 55 may perform a web service in response to the request signal. In this example, the processor 55 may perform the web service directly based on the type of the web service or may request the web service from the user terminal device. For example, if the requested web service is a product automatic purchase service, the processor 55 may perform the automatic purchase with respect to the requested product, and if the requested web service is a product advertisement service, the processor 55 may transmit a product advertisement service (including URL information regarding the product advertisement) to the user terminal device 100.

Figure 12:
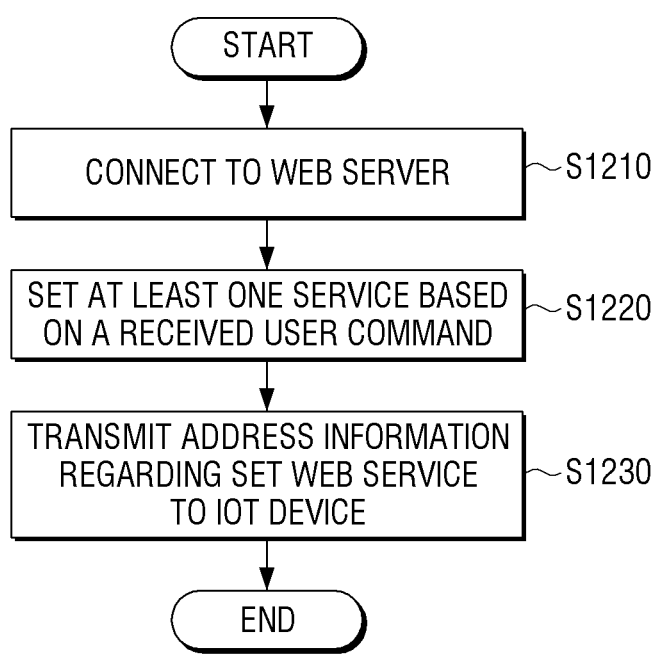
FIG. 12 is a flowchart illustrating an example web service providing method according to an example embodiment.

FIG. 12 is a flowchart illustrating an example method of providing web service of the user terminal device 100 according to an example embodiment.

The user terminal device 100 connects to the web server 50 (S1210). In this example, the user terminal device 100 may connect to the web server 50 and receive information regarding a plurality of services provided by the web server 50.

The user terminal device 100 sets at least one of the plurality of services provided by the web server 50 based on a received user command (S1220). For example, the user terminal device 100 may set at least one service through a list including the plurality of services provided by the web server 50.

The user terminal device 100 transmits address information regarding the set web service to the IoT device 200 (S1230). In this example, the address information regarding the web service may be URL information of a server where the script information to perform the web service is stored. Accordingly, the IoT device 200 may connect to the web server 50 through the address information, download the script information and receive various web services based on the script information.

According to the above-described various example embodiments, a user may be provided with various web-based web services more intuitively and conveniently.

In the above example embodiments, a web service is provided in an IoT environment, but this is only an example. A web service can be provided in various environments.

Figure 13:
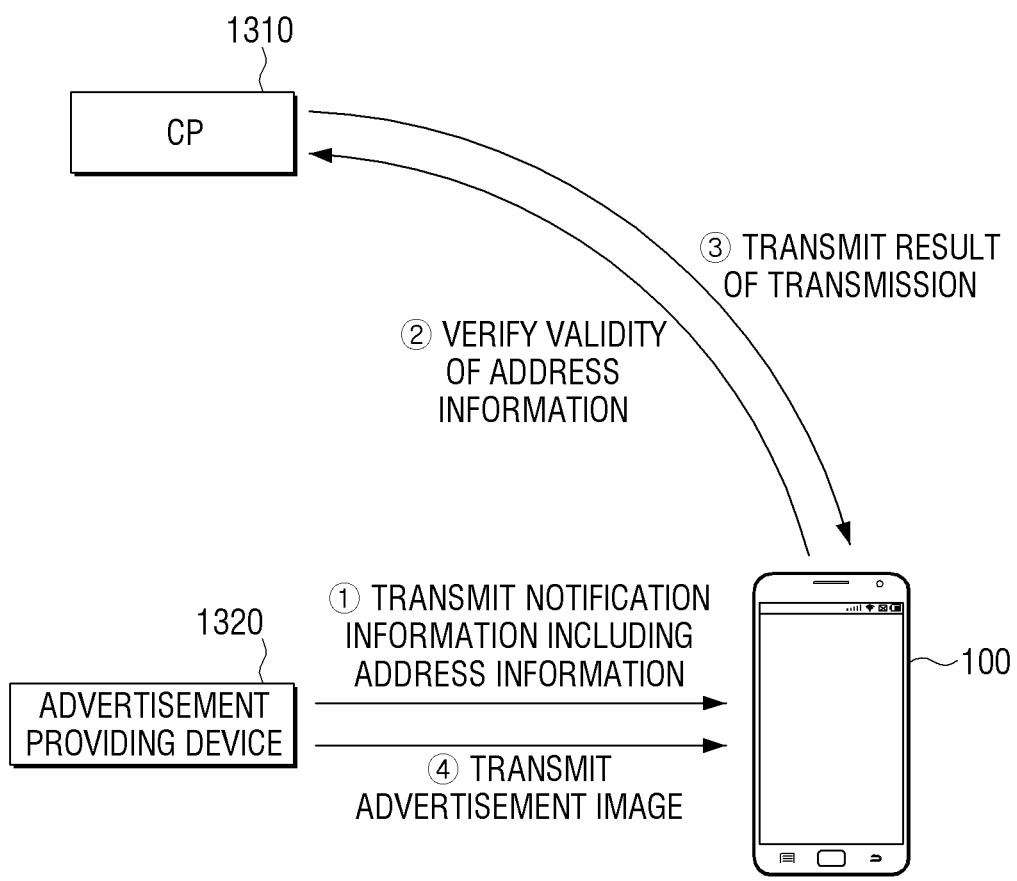
FIGS. 13 and 14 are diagrams illustrating various example embodiments for providing a web service according to various example embodiments.

FIG. 13 is a diagram illustrating an example method of providing a web-based advertisement service in an advertisement providing system 1300 according to another example embodiment. In this example, the advertisement providing system 1300 may include the user terminal device 100, the advertisement providing device 1320 and a content provider (CP) 1310.

While the user terminal device 100 is using a web browser, the user terminal device 100 transmits notification information from an advertisement providing device 1320. In this example, the notification information may be received through a beacon signal, and the notification information may be URL information for advertisement and address information to verify validity of the URL information.

In this example, the user terminal device 100 may receive many beacon signals, and may perform first filtering in the web browser. In this example, the user terminal device 100 may filter a beacon signal using context information (history information of the web browser, book mark information, reliable site information), etc. For example, if a beacon signal regarding a coffee shop advertisement is received, the user terminal device 100 may determine a user's level of interest regarding the coffee shop based on the context information and filter the beacons signal regarding the coffee shop advertisement. In addition, the user terminal device 100 may filter the beacon signal based on a user setting. In other words, the user terminal device 100 may store information regarding the type of beacon signal that the user wishes to filter based on a user setting and may filter beacons signals based on the stored information.

The user terminal device 100 may transmit a signal for requesting verification of the validity of URL information for advertisement based on address information to a CP 1310.

The CP 1310 performs verification regarding the URL information stored in the request signal and transmit the verification result to the user terminal device 100.

When the validity of the URL information is verified, the user terminal device 100 may connect to the advertisement providing device 1320, and the advertisement providing device 1320 may transmit an advertisement image to the user terminal device 100.

In this example, the user terminal device 100 may display the advertisement image together on the web browser which is being executed.

Figure 14:
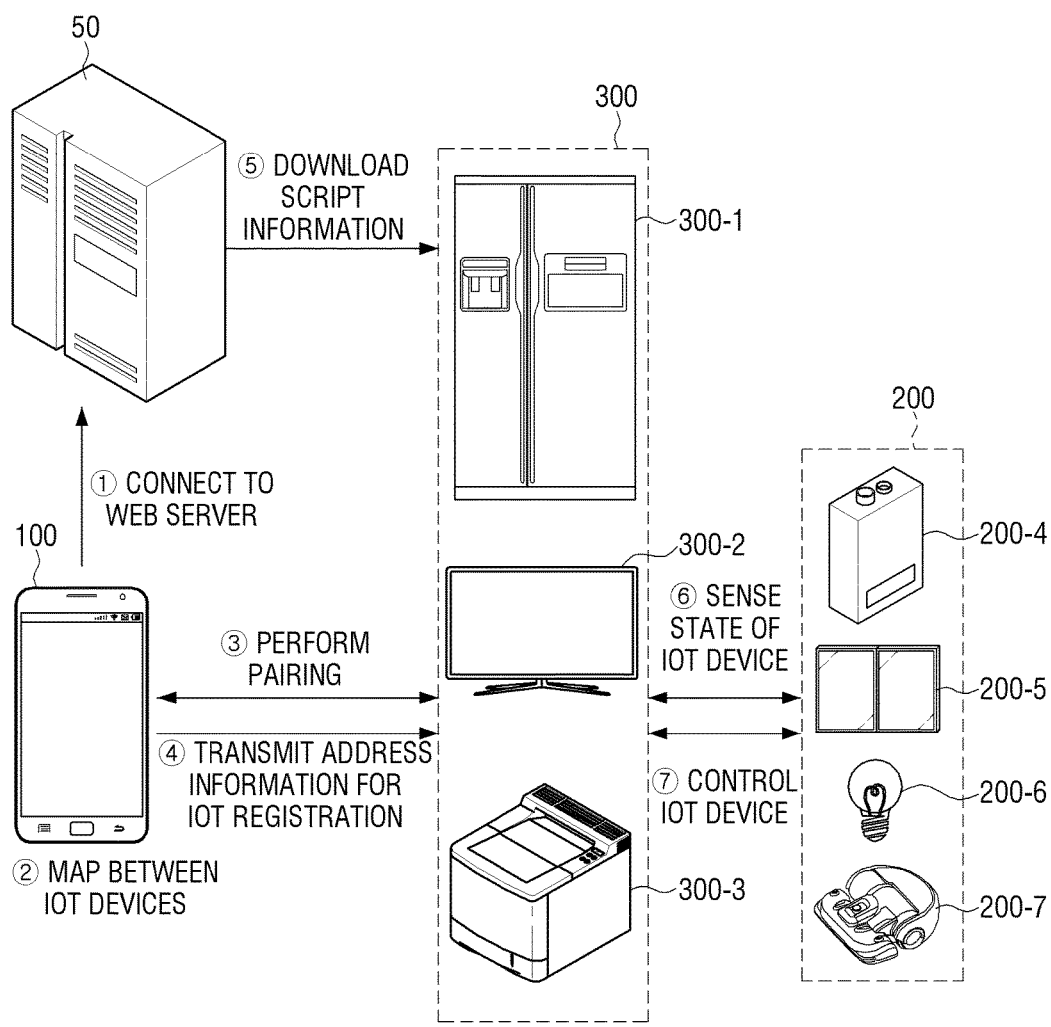

FIG. 14 is a diagram illustrating an example embodiment for registering the low-specification IoT device 200 in the high-specification IoT device 300 which serves as a hub in order to provide a web service in the above-described web service providing system 10" in FIG. 1C.

As illustrated in FIG. 14, the user terminal device 100 may be a smart phone, and the high-specification IoT device 300 which serves as a hub may include a refrigerator 300-1, a smart TV 300-2 and a printer 300-3. The low-specification IoT device 200 which provides only a local network function, has a small storage space or does not have a display function may include a boiler 200-4, a window 200-5, a light 200-6, and a cleaning robot 200-7.

The user terminal device 100 may, first of all, acquire a list of high-specification IoT device 300 which may serve as a hub. For example, the user terminal device 100 may connect to an external server (for example, the web server 50) and acquire the list of high-specification IoT device 300. Alternatively, the list of high-specification IoT device 300 may be stored in the user terminal device 100 in advance. The user terminal device 100 may also acquire resources information from an IoT device which can communicate with the user terminal device 100, determine the high-specification IoT device 300 which serves as a hub based on the acquired resources information and make a list therewith.

The examples of the conditions of the high-specification IoT device 300 may be an electronic device which can communicate with the user terminal device 100 and the web server 50 and has a storage capacity of storing the received script information to perform a web service.

In addition, the user terminal device 100 may acquire a list of low-specification IoT device 200. For example, the user terminal device 100 may connect to an external server (for example, the web server 50) and acquire a list of low specification IoT device 200. Alternatively, the list of low-specification IoT device 200 may be stored in the user terminal device 100 in advance. The user terminal device 100 may also acquire resources information from an IoT device which can communicate with the user terminal device 100, determine the low-specification IoT device 200 based on the acquired resources information and prepare a list therewith. The examples of the conditions of the low-specification IoT device 200 may be an electronic device which is capable of performing only local network communication, has too small a storage space to store script information, or has no display function.

The user terminal device 100 which acquires the list of the high-specification IoT device 300 and the list of the low-specification IoT device 200 may display a screen for mapping the high-specification IoT device 300 and the low-specification IoT device 200 as illustrated in FIG. 15A. For example, the mapping of the high-specification IoT device 300 and the low-specification IoT device 200 may represent connecting the two so as to register the low-specification IoT device 200 in the high-specification IoT device 300 which serves as a hub.

For example, as illustrated in FIG. 15A, if the refrigerator 300-1, the smart TV 300-2 and the printer 300-3 are displayed as the high-specification IoT device 300 in the hub candidate list and the boiler 200-4, the window 200-5, the light 200-6, and the cleaning robot 200-7 are displayed in the list of the low-specification IoT device 200, a user may select the low-specification IoT device 200-4 and drag it to the high-specification IoT device 300-1.

Accordingly, as illustrated in FIG. 15B, the high-specification IoT device 300 and the low-specification IoT device 200 are mapped and displayed. In FIG. 15(B), the boiler 200-4 and the window 200-5 may be mapped to the refrigerator 300-1 which serves as a hub, and the light 200-6 and the cleaning robot 200-7 may be mapped to the smart TV 300-2.

According to another example embodiment, the process of mapping the high-specification IoT device 300 and the low-specification IoT device 200 may be performed automatically. For example, the high-specification IoT device 300 which is to be served as a hub may be mapped to the nearby low-specification IoT device 200. Alternatively, the high-specification IoT device 300 may be mapped to the low-specification IoT device 200 which can be communicated through a communication protocol supported by the high-specification IoT device 300. The high-specification IoT device 300 can be mapped to the low-specification IoT device 200 when the strength of a communication signal is higher than a threshold value.

When the high-specification IoT device 300 and the low-specification IoT device 200 are mapped to each other, the user terminal device 100 may perform pairing with the high-specification IoT device 300 which is to be served as a hub again in FIG. 14. In this example, if the user terminal device 100 has been paired with the high-specification IoT device 300 previously, the user terminal device 100 may omit the pairing process.

Subsequently, in order to register the low-specification IoT device 200 in the high-specification IoT device 300 which serves as a hub, the user terminal device 100 may transmit address information (for example, URL information) required for an IoT registration service to the high-specification IoT device 300 which serves as a hub.

The high-specification IoT device 300 may connect to the web server 50 based on the received address information and download information (or a protocol) for the IoT registration service. The high-specification IoT device 300 may search the low-specification IoT device 200 which is mapped to the high-specification IoT device 300 using the downloaded information (or the protocol) and register the searched IoT device 200.

When the high-specification IoT device 300 serves as a hub device and the low-specification IoT device 200 is registered, the high-specification IoT device 300 may sense the state of the low-specification IoT device 300, and if it is sensed that the low-specification IoT device 300 is in a specific state, may transmit a control command to control the low-specification IoT device 200.

A user terminal device and a method for providing a web service of a user terminal device according to the above-described various example embodiments may be implemented as a program and provided in a display apparatus or an input device. For example, a program including a controlling method of a display apparatus may be stored in a non-transitory computer readable medium and provided therein.

The non-transitory recordable medium refers to a medium which may store data semi-permanently, and is readable by an apparatus. For example, the above-described various applications and programs may be stored and provided in a non-transitory recordable medium such as CD, DVD, hard disk, Blu-ray disk, USB, memory card, ROM, etc.

The foregoing example embodiments and advantages are merely examples and are not to be construed as limiting the present disclosure. The present teaching can be readily applied to other types of apparatuses. Also, the description of the example embodiments of the present disclosure is intended to be illustrative, and not to limit the scope of the claims, and many alternatives, modifications, and variations will be apparent to those skilled in the art.

What is claimed is:

1. A method for providing a web service including a user terminal device, the method comprising:
   connecting the user terminal device to a plurality of Internet of Things (IoT) devices, and to a web server which provides a plurality of web services;
   setting, via the user terminal device, at least one of the plurality of web services provided by the web server based on a received user command;
   identifying at least one IoT device, of the plurality of IoT devices, corresponding to the set web service;
   transmitting, from the user terminal device, information on an address of the set web service to the identified IoT device;
   wherein the IoT device connects to the web server based on the address information and downloads script information corresponding to the web service from the web server not via the user terminal;
   wherein the IoT device, in response to sensing a predetermined state of the IoT device among a plurality of predetermined states included in the script information regarding the IoT device, transmits Uniform Resource Locator (URL) information corresponding to the predetermined state to the user terminal to perform a web service corresponding to the sensed predetermined state; and
   wherein the user terminal, in response to receiving the URL information from the IoT device, provides the web service based on the received URL information.

2. The method as claimed in claim 1, further comprising:
   displaying a user interface (UI) regarding a web service which is performed in response to the request.

3. The method as claimed in claim 1, comprising:
   receiving URL information corresponding to the predetermined state from the IoT device in response to sensing a predetermined state based on the script information by the IoT device; and
   providing a web service based on the received URL information.

4. The method as claimed in claim 1, wherein the IoT device, in response to a button on the IoT device being selected, is configured to transmit a product purchase request corresponding to the button to the web server based on the script information,
   wherein the method further comprises:
   receiving information regarding the product purchase request from the web server; and
   displaying information regarding the received product purchase request.

5. The method as claimed in claim 1, wherein the IoT device, in response to sensing a predetermined state of another external IoT device based on the script information, is configured to request the web server to provide a web service.

6. The method as claimed in claim 1, wherein the IoT device is configured to control a setting of the IoT device based on the script information.

7. The method as claimed in claim 1, wherein the setting comprises:
   displaying a list including a plurality of web services provided by the web server; and
   setting the selected web service as a service to be transmitted to the IoT device in response to at least one of the plurality of web services included in the list being selected.

8. A user terminal device comprising:
   communication circuitry configured to perform communication with a web server which provides a plurality of web services, and with a plurality of IoT devices;
   input circuitry configured to receive a user command; and
   a processor configured to:
   control the communication circuitry to connect to the plurality of IoT devices and the web server, set at least one of the plurality of web services provided by the web server based on a received user command,
   identify at least one IoT device, of the plurality of IoT devices, corresponding to the set web service, and
   transmit information on an address of the set web service to the identified IoT device,
   wherein the IoT device connects to the web server based on the address information and download script information corresponding to the set web service from the web server not via the user terminal;
   wherein the IoT device, in response to sensing a predetermined state of the IoT device among a plurality of predetermined states included in the script information regarding the IoT device, transmits URL information corresponding to the predetermined state to the user terminal to perform a web service corresponding to the sensed predetermined state; and wherein the user terminal, in response to receiving the URL information from the IoT device, provides the web service based on the received URL information.

9. The device as claimed in claim 8, further comprising: a display, wherein the processor is configured to control the display to display a UI regarding a web service which is performed in response to the request.

10. The device as claimed in claim 8, wherein the processor is configured to control the communication circuitry to receive URL information corresponding to the predetermined state from the IoT device in response to at least one of the plurality of web services included in the list being selected, and to provide a web service based on the received URL information.

11. The device as claimed in claim 8, wherein the IoT device is configured to transmit a product purchase request corresponding to the button to the web server based on the script information in response to at least one of the plurality of web services included in the list being selected, wherein the processor is configured to control the communication circuitry to receive information regarding the product purchase request from the web server, and to provide the received information regarding the product purchase request.

12. The device as claimed in claim 8, wherein the IoT device is configured to request the web server to provide a web service in response to sensing a predetermined state of another external IoT device based on the script information.

13. The device as claimed in claim 8, wherein the IoT device is configure to control a setting of the IoT device based on the script information.

14. The device as claimed in claim 8, further comprising: a display, wherein the processor is configured to control the display to display a list including a plurality of web services provided by the web server; and the processor is further configured to set the selected web service as a service to be transmitted to the IoT device in response to at least one of the plurality of web services included in the list being selected.

15. A non-transitory computer readable recording medium storing a program which, when executed, causes a user terminal device to perform a service providing method, wherein the service providing method of the user terminal device comprises:

connecting to a web server which provides a plurality of web services;

setting at least one of the plurality of web services which are provided by the web server based on a received user command;

identifying at least one IoT device, of the plurality of IoT devices, corresponding to the set web service; and transmitting information on an address of the set web service to the identified IoT device wherein the IoT device connects to the web server based on the address information and download script information corresponding to the set web service from the web server not via the user terminal, wherein the IoT device, in response to sensing a predetermined state of the IoT device among a plurality of predetermined states included in the script information regarding the IoT device, transmits URL information corresponding to the predetermined state to requests the user terminal to perform a web service corresponding to the sensed predetermined state; and wherein the user terminal, in response to receiving the URL information from the IoT device, provides the web service based on the received URL information.

* * * * *